(12) United States Patent
Baheti et al.

(10) Patent No.: US 9,014,480 B2
(45) Date of Patent: Apr. 21, 2015

(54) IDENTIFYING A MAXIMALLY STABLE EXTREMAL REGION (MSER) IN AN IMAGE BY SKIPPING COMPARISON OF PIXELS IN THE REGION

(71) Applicant: QUALCOMM Incorporated, San Diego, CA (US)

(72) Inventors: Pawan Kumar Baheti, Bangalore (IN); Kishor K. Barman, Bangalore (IN); Raghuraman Krishnamoorthi, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/797,433

(22) Filed: Mar. 12, 2013

(65) Prior Publication Data

US 2014/0023271 A1     Jan. 23, 2014

Related U.S. Application Data

(60) Provisional application No. 61/674,846, filed on Jul. 23, 2012, provisional application No. 61/673,700, filed on Jul. 19, 2012.

(51) Int. Cl.
*G06K 9/48* (2006.01)
*G06K 9/46* (2006.01)
*G06K 9/32* (2006.01)

(52) U.S. Cl.
CPC ............ *G06K 9/4661* (2013.01); *G06K 9/4638* (2013.01); *G06K 9/4642* (2013.01); *G06K 9/3233* (2013.01)

(58) Field of Classification Search
None
See application file for complete search history.

(56) References Cited

U.S. PATENT DOCUMENTS

| 3,710,321 | A | 1/1973 | Rubenstein |
| 4,654,875 | A | 3/1987 | Srihari et al. |

(Continued)

FOREIGN PATENT DOCUMENTS

| EP | 1146478 A2 | 10/2001 |
| EP | 1840798 A1 | 10/2007 |

(Continued)

OTHER PUBLICATIONS

Chaudhuri et al. "Skew Angle Detection of Digitized Indian Script Documents", IEEE Transactions on Pattern Analysis and Machine Intelligence, Feb. 1997, pp. 182-186, vol. 19, No. 2.

(Continued)

*Primary Examiner* — Jingge Wu
(74) *Attorney, Agent, or Firm* — Silicon Valley Patent Group LLP

(57) ABSTRACT

A difference in intensities of a pair of pixels in an image is repeatedly compared to a threshold, with the pair of pixels being separated by at least one pixel ("skipped pixel"). When the threshold is found to be exceeded, a selected position of a selected pixel in the pair, and at least one additional position adjacent to the selected position are added to a set of positions. The comparing and adding are performed multiple times to generate multiple such sets, each set identifying a region in the image, e.g. an MSER. Sets of positions, identifying regions whose attributes satisfy a test, are merged to obtain a merged set. Intensities of pixels identified in the merged set are used to generate binary values for the region, followed by classification of the region as text/non-text. Regions classified as text are supplied to an optical character recognition (OCR) system.

26 Claims, 15 Drawing Sheets

(56) References Cited

U.S. PATENT DOCUMENTS

| | | | |
|---|---|---|---|
| 5,321,768 A | 6/1994 | Fenrich et al. | |
| 5,459,739 A | 10/1995 | Handley et al. | |
| 5,465,304 A | 11/1995 | Cullen et al. | |
| 5,519,786 A | 5/1996 | Courtney et al. | |
| 5,563,403 A | 10/1996 | Bessho et al. | |
| 5,633,954 A | 5/1997 | Gupta et al. | |
| 5,751,850 A | 5/1998 | Rindtorff | |
| 5,764,799 A | 6/1998 | Hong et al. | |
| 5,768,451 A | 6/1998 | Hisamitsu et al. | |
| 5,805,747 A | 9/1998 | Bradford | |
| 5,835,633 A | 11/1998 | Fujisaki et al. | |
| 5,844,991 A | 12/1998 | Hochberg et al. | |
| 5,978,443 A | 11/1999 | Patel | |
| 6,023,536 A | 2/2000 | Visser | |
| 6,266,439 B1 | 7/2001 | Pollard et al. | |
| 6,393,443 B1 | 5/2002 | Rubin et al. | |
| 6,473,517 B1 | 10/2002 | Tyan et al. | |
| 6,674,919 B1 | 1/2004 | Ma et al. | |
| 6,678,415 B1 | 1/2004 | Popat et al. | |
| 6,687,421 B1 | 2/2004 | Navon | |
| 6,738,512 B1 | 5/2004 | Chen et al. | |
| 6,954,795 B2 | 10/2005 | Takao et al. | |
| 7,142,727 B2 | 11/2006 | Notovitz et al. | |
| 7,263,223 B2 | 8/2007 | Irwin | |
| 7,333,676 B2 | 2/2008 | Myers et al. | |
| 7,403,661 B2 | 7/2008 | Curry et al. | |
| 7,450,268 B2 | 11/2008 | Martinez et al. | |
| 7,724,957 B2 | 5/2010 | Abdulkader | |
| 7,738,706 B2 | 6/2010 | Aradhye et al. | |
| 7,783,117 B2 | 8/2010 | Liu et al. | |
| 7,817,855 B2 | 10/2010 | Yuille et al. | |
| 7,889,948 B2 | 2/2011 | Steedly et al. | |
| 7,961,948 B2 | 6/2011 | Katsuyama | |
| 7,984,076 B2 | 7/2011 | Kobayashi et al. | |
| 8,009,928 B1 | 8/2011 | Manmatha et al. | |
| 8,189,961 B2 | 5/2012 | Nijemcevic et al. | |
| 8,194,983 B2 | 6/2012 | Al-Omari et al. | |
| 8,285,082 B2 | 10/2012 | Heck | |
| 8,306,325 B2 | 11/2012 | Chang | |
| 8,417,059 B2 | 4/2013 | Yamada | |
| 8,542,926 B2 | 9/2013 | Panjwani et al. | |
| 8,644,646 B2 | 2/2014 | Heck | |
| 2003/0026482 A1 | 2/2003 | Dance | |
| 2003/0099395 A1 | 5/2003 | Wang et al. | |
| 2003/0215137 A1 | 11/2003 | Wnek | |
| 2004/0179734 A1 | 9/2004 | Okubo | |
| 2004/0240737 A1 | 12/2004 | Lim et al. | |
| 2005/0041121 A1 | 2/2005 | Steinberg et al. | |
| 2005/0123199 A1 | 6/2005 | Mayzlin et al. | |
| 2005/0238252 A1 | 10/2005 | Prakash et al. | |
| 2006/0039605 A1 | 2/2006 | Koga | |
| 2006/0215231 A1 | 9/2006 | Borrey et al. | |
| 2006/0291692 A1 | 12/2006 | Nakao et al. | |
| 2007/0110322 A1 | 5/2007 | Yuille et al. | |
| 2007/0116360 A1 | 5/2007 | Jung et al. | |
| 2007/0217676 A1 | 9/2007 | Grauman et al. | |
| 2008/0008386 A1 | 1/2008 | Anisimovich et al. | |
| 2008/0063273 A1 | 3/2008 | Shimodaira | |
| 2008/0112614 A1 | 5/2008 | Fluck et al. | |
| 2009/0060335 A1 | 3/2009 | Rodriguez et al. | |
| 2009/0202152 A1 | 8/2009 | Takebe et al. | |
| 2009/0232358 A1* | 9/2009 | Cross | 382/103 |
| 2009/0252437 A1 | 10/2009 | Li et al. | |
| 2009/0316991 A1 | 12/2009 | Geva et al. | |
| 2009/0317003 A1 | 12/2009 | Heilper et al. | |
| 2010/0049711 A1 | 2/2010 | Singh et al. | |
| 2010/0067826 A1 | 3/2010 | Honsinger et al. | |
| 2010/0080462 A1 | 4/2010 | Miljanic et al. | |
| 2010/0128131 A1 | 5/2010 | Tenchio et al. | |
| 2010/0141788 A1 | 6/2010 | Hwang et al. | |
| 2010/0144291 A1 | 6/2010 | Stylianou et al. | |
| 2010/0172575 A1 | 7/2010 | Lukac et al. | |
| 2010/0195933 A1 | 8/2010 | Nafarieh | |
| 2010/0232697 A1 | 9/2010 | Mishima et al. | |
| 2010/0239123 A1 | 9/2010 | Funayama et al. | |
| 2010/0245870 A1 | 9/2010 | Shibata | |
| 2010/0272361 A1 | 10/2010 | Khorsheed et al. | |
| 2010/0296729 A1 | 11/2010 | Mossakowski | |
| 2011/0052094 A1 | 3/2011 | Gao et al. | |
| 2011/0081083 A1 | 4/2011 | Lee et al. | |
| 2011/0188756 A1 | 8/2011 | Lee et al. | |
| 2011/0215147 A1* | 9/2011 | Goncalves | 235/383 |
| 2011/0222768 A1 | 9/2011 | Galic et al. | |
| 2011/0249897 A1 | 10/2011 | Chaki et al. | |
| 2011/0274354 A1 | 11/2011 | Nijemcevic | |
| 2011/0280484 A1 | 11/2011 | Ma et al. | |
| 2011/0285873 A1* | 11/2011 | Showering | 348/231.99 |
| 2012/0051642 A1 | 3/2012 | Berrani et al. | |
| 2012/0066213 A1 | 3/2012 | Ohguro | |
| 2012/0092329 A1 | 4/2012 | Koo et al. | |
| 2012/0114245 A1 | 5/2012 | Lakshmanan et al. | |
| 2012/0155754 A1 | 6/2012 | Chen et al. | |
| 2013/0001295 A1* | 1/2013 | Goncalves | 235/375 |
| 2013/0058575 A1 | 3/2013 | Koo et al. | |
| 2013/0129216 A1 | 5/2013 | Tsai et al. | |
| 2013/0194448 A1* | 8/2013 | Baheti et al. | 348/222.1 |
| 2013/0195315 A1* | 8/2013 | Baheti et al. | 382/103 |
| 2013/0195360 A1 | 8/2013 | Krishna Kumar et al. | |
| 2013/0195376 A1 | 8/2013 | Baheti et al. | |
| 2013/0308860 A1 | 11/2013 | Mainali et al. | |
| 2014/0003709 A1* | 1/2014 | Ranganathan et al. | 382/159 |
| 2014/0022406 A1 | 1/2014 | Baheti et al. | |
| 2014/0023270 A1 | 1/2014 | Baheti et al. | |
| 2014/0023273 A1 | 1/2014 | Baheti et al. | |
| 2014/0023274 A1 | 1/2014 | Barman et al. | |
| 2014/0023275 A1 | 1/2014 | Krishna Kumar et al. | |
| 2014/0023278 A1 | 1/2014 | Krishna Kumar et al. | |
| 2014/0161365 A1 | 6/2014 | Acharya | |
| 2014/0168478 A1 | 6/2014 | Baheti et al. | |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Chen, et al. "Detecting and reading text in natural scenes," IEEE Computer Society Conference on Computer Vision and Pattern Recognition (CVPR'04), 2004, pp. 1-8.

Epshtein et al. "Detecting text in natural scenes with stroke width transform," Computer Vision and Pattern Recognition (CVPR) 2010, pp. 2963-2970, (as downloaded from "http://research.microsoft.com/pubs/149305/1509.pdf").

Jain, et al. "Automatic text location in images and video frames", Pattern Recognition, 1998, pp. 2055-2076, vol. 31, No. 12.

Jayadevan, et al. "Offline Recognition of Devanagari Script: A Survey", IEEE Transactions on Systems, Man, and Cybernetics—Part C: Applications and Reviews, 2010, pp. 1-15.

Kapoor et al. "Skew angle detection of a cursive handwritten Devanagari script character image", Indian Institute of Science, May-Aug. 2002, pp. 161-175.

Lee, et al. "A new methodology for gray-scale character segmentation and recognition," IEEE Transactions on Pattern Analysis and Machine Intelligence, Oct. 1996, pp. 1045-1050, vol. 18, No. 10.

Li et al. "Automatic Text Detection and Tracking in a Digital Video", IEEE Transactions on Image Processing, Jan. 2000, pp. 147-156, vol. 9 No. 1.

Matas, et al. "Robust Wide Baseline Stereo from Maximally Stable Extremal Regions", Proc. of British Machine Vision Conference, 2002, pp. 384-393.

Mikulik, et al. "Construction of Precise Local Affine Frames," Center for Machine Perception, Czech Technical University in Prague, Czech Republic, Abstract and second paragraph of Section 1; Algorithms 1 & 2 of Section 2 and Section 4, International Conference on Pattern Recognition, 2010, pp. 1-5.

Pal, et al. "Indian script character recognition: a survey", Pattern Recognition Society, Published by Elsevier Ltd, 2004, pp. 1887-1899.

(56) References Cited

OTHER PUBLICATIONS

Chen et al. "Robust Text Detection in Natural Images With Edge-Enhanced Maximally Stable Extremal Regions", believed to be published in IEEE International Conference on Image Processing (ICIP), Sep. 2011, pp. 1-4.

Nister, et al. "Linear Time Maximally Stable Extremal Regions", ECCV, 2008, Part II, LNCS 5303, pp. 183-196, published by Springer-Verlag Berlin Heidelberg.

Agrawal, M. et al. "Generalization of Hindi OCR Using Adaptive Segmentation and Font Files," V. Govindaraju, S. Setlur (eds.), Guide to OCR for Indic Scripts, Advances in Pattern Recognition, Springer-Verlag London Limited 2009, pp. 181-207.

Dlagnekov, L. et al. "Detecting and Reading Text in Natural Scenes," Oct. 2004, pp. 1-22.

Elgammal, A.M. et al. "Techniques for Language Identification for Hybrid Arabic-English Document Images," believed to be published in 2001 in Proceedings of IEEE 6th International Conference on Document Analysis and Recognition, pp. 1-5.

Holmstrom, L. et al. "Neural and Statistical Classifiers—Taxonomy and Two Case Studies," IEEE Transactions on Neural Networks, Jan. 1997, pp. 5-17, vol. 8 (1).

Jain, A. K. et al. "Automatic Text Location in Images and Video Frames," believed to be published in Proceedings of Fourteenth International Conference on Pattern Recognition, vol. 2, Aug. 1998, pp. 1497-1499.

Machine Learning, retrieved from http://en.wikipedia.org/wiki/Machine_learning, May 7, 2012, pp. 1-8.

Moving Average, retrieved from http://en.wikipedia.org/wiki/Moving_average, Jan. 23, 2013, pp. 1-5.

Pardo, M. et al. "Learning From Data: A Tutorial With Emphasis on Modern Pattern Recognition Methods," IEEE Sensors Journal, Jun. 2002, pp. 203-217, vol. 2 (3).

Park, J-M. et al. "Fast Connected Component Labeling Algorithm Using a Divide and Conquer Technique," believed to be published in Matrix (2000), vol. 4 (1), pp. 4-7, Publisher: Elsevier Ltd.

Renold, M. "Detecting and Reading Text in Natural Scenes," Master's Thesis, May 2008, pp. 1-59.

Shin, H. et al. "Application of Floyd-Warshall Labelling Technique: Identification of Connected Pixel Components in Binary Image," Kangweon-Kyungki Math. Jour. 14(2006), No. 1, pp. 47-55.

Vedaldi, A. "An Implementation of Multi-Dimensional Maximally Stable Extremal Regions", Feb. 7, 2007, pp. 1-7.

VLFeat—Tutorials—MSER, retrieved from http://www.vlfeat.org/overview/mser.html, Apr. 30, 2012, pp. 1-2.

"4.1 Points and patches" In: Szeliski Richard: "Computer Vision—Algorithms and Applications", 2011, Springer-Verlag, London, XP002696110, p. 195, ISBN: 978-1-84882-934-3.

Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-84888-329-3.

Chowdhury A.R., et al., "Text Detection of Two Major Indian Scripts in Natural Scene Images", Sep. 22, 2011 (Sep. 2, 2011), Camera-Based Document Analysis and Recognition, Springer Berlin Heidelberg, pp. 42-57, XP019175802, ISBN: 978-3-642-29363-4.

Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.

Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.

Setlur, et al., "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.

Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.

Chaudhuri B.B., et al., "An OCR system to read two Indian language scripts: Bangla and Devnagari (Hindi)", Proceedings of the 4th International Conference on Document Analysis and Recognition. (ICDAR). ULM, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.

Chaudhury S (Eds.): OCR Technical Report for the project "Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].

Chen Y.L., "A knowledge-based approach for textual information extraction from mixed text/graphics complex document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.

Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.

Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514 , ISBN: 978-1-4244-1630-1 abstract Section 2. Multi-resoltuion MSER.

International Search Report and Written Opinion—PCT/US2013/049499—ISA/EPO—Nov. 6, 2013.

Minoru M., Ed., "Character Recognition", Aug. 2010, Sciyo, XP002715748, ISBN: 978-953-307-105-3 pp. 91-95, p. 92, section "7.3 Baseline Detection Process".

Pal U et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP010560519, DOI:10.1109/ICDAR.2001.953801, ISBN: 978-0-7695-1263-1.

Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc e on Jerusalem, Israel Oct. 9-13, 1994, Los Alamitos, CA, USA, IEEE Comput. Soc, vol. 2, Oct. 9, 1994, pp. 269-273, XP010216292, DOI: 10.1109/ICPR.1994.576917 ISBN: 978-0-8186-6270-6 the whole document.

Premaratne H.L., et al., "Lexicon and hidden Markov model-based optimisation of the recognised Sinhala script", Pattern Recognition Letters, Elsevier, Amsterdam, NL, vol. 27, No. 6, Apr. 15, 2006, pp. 696-705, XP027922538, ISSN: 0167-8655.

Ray A.K et al., "Information Technology—Principles and Applications". 2004. Prentice-Hall of India Private Limited. New Delhi! XP002712579, ISBN: 81-203-2184-7, pp. 529-531.

Senda S., et al., "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.

Senk V., et al., "A new bidirectional algorithm for decoding trellis codes," Eurocon' 2001, Trends in Communications, International Conference on Jul. 4-7, 2001, Piscataway, NJ, USA, IEEE, Jul. 4, 2001, pp. 34-36, vol. I, XP032155513, DOI :10.1109/EURCON. 2001.937757 ISBN : 978-0-7803-6490-5.

Sinha R.M.K., et al., "On Devanagari document processing", Systems, Man and Cybernetics, 1995. Intelligent Systems for the 21st Century., IEEE International Conference on Vancouver, BC, Canada Oct. 22-25, 1995, New York, NY, USA,IEEE, US, vol. 2, Oct. 22, 1995, pp. 1621-1626, XP010194509, DOI: 10-1109/ICSMC.1995. 538004 ISBN: 978-0-7803-2559-3 the whole document.

Song Y., et al., "A Handwritten Character Extraction Algorithm for Multi-language Document Image", 2011 International Conference

(56) References Cited

OTHER PUBLICATIONS on Document Analysis and Recognition, Sep. 18, 2011, pp. 93-98, XP055068675, DOI: 10.1109/ICDAR.2011.28 ISBN: 978-1-45-771350-7.

Uchida S et al., "Skew Estimation by Instances", 2008 The Eighth IAPR International Workshop on Document Analysis Systems, Sep. 1, 2008, pp. 201-208, XP055078375, DOI: 10.1109/DAS.2008.22, ISBN: 978-0-76-953337-7.

Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.

Wu V., et al., "TextFinder: An Automatic System to Detect and Recognize Text in Images", IEEE Transactions on Pattern Analysis and Machine Intelligence, vol. 21, No. 11, Nov. 1, 1999, pp. 1224-1229, XP055068381.

\* cited by examiner

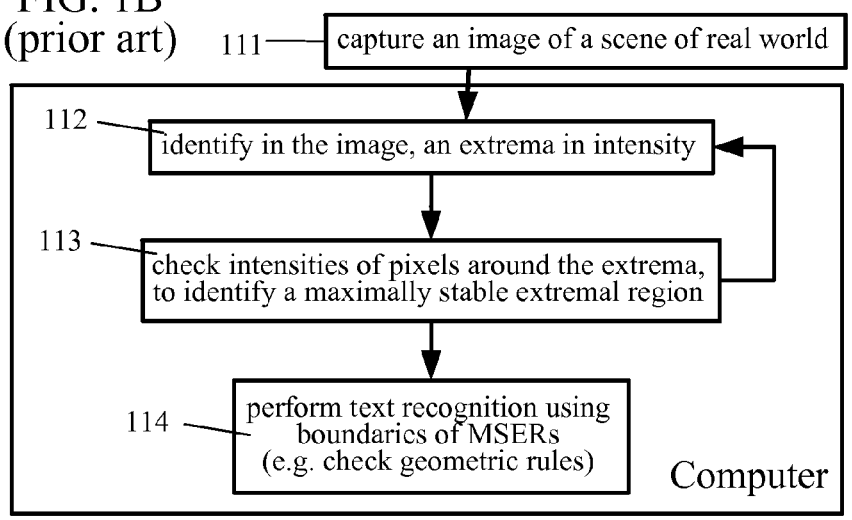

IDENTIFYING A MAXIMALLY STABLE EXTREMAL REGION (MSER) IN AN IMAGE BY SKIPPING COMPARISON OF PIXELS IN THE REGION

CROSS-REFERENCE TO US PROVISIONAL APPLICATIONS

This application claims priority under 35 USC §119 (e) from U.S. Provisional Application No. 61/674,846 filed on Jul. 23, 2012 and entitled "Identifying A Maximally Stable Extremal Region (MSER) In An Image By Skipping Comparison Of Pixels In The Region", which is incorporated herein by reference in its entirety.

This application also claims priority under 35 USC §119 (e) from U.S. Provisional Application No. 61/673,700 filed on Jul. 19, 2012 and entitled "Parameter Selection And Coarse Localization Of Interest Regions For MSER Processing", which is incorporated herein by reference in its entirety.

CROSS-REFERENCE TO US NON-PROVISIONAL APPLICATION

This application is related to concurrently filed and co-owned U.S. application Ser. No. 13/796,729 entitled "Parameter Selection And Coarse Localization Of Interest Regions For MSER Processing" which is incorporated herein by reference in its entirety.

FIELD

This patent application relates to apparatuses and methods that process an image to identify therein regions that differ from their surroundings.

BACKGROUND

Mobile devices such as a cell phone 108 (FIG. 1A) include a camera that can be used by a person 110 to capture an image (also called "natural image" or "real world image") of a scene 100 in real world (as per act 111 in FIG. 1B), such as image 107 (shown displayed on a screen 106 of cell phone 108 in FIG. 1A). Natural image 107 may be uploaded to a computer for recognition of text therein, based on regions (also called "blobs") whose boundaries differ significantly from surrounding pixels in one or more properties, such as intensity and/or color. Some prior art methods first identify a pixel of local minima or maxima (also called "extrema") of a property (such as intensity) in the image (as per act 112 in FIG. 1B), followed by identifying pixels that are located around the identified extrema pixel, within a predetermined range of values of the property, so as to identify a region (as per act 113 in FIG. 1B), known in the prior art as maximally stable extremal region or MSER.

MSERs are regions that are geometrically contiguous (and one can go from one pixel to any other pixel by traversing neighboring pixels in such a region) with monotonic transformation in property values, and invariant to affine transformations (transformations that preserve straight lines and ratios of distances between points on the straight lines). In prior art methods known to the current inventors, MSER detection evaluates intensities of all pixels in such a region (e.g. to ensure that the pixels contact one another, so that the region is contiguous).

After MSERs are identified, boundaries of MSERs may be used in the prior art as connected components (see act 114 in FIG. 1B), to identify candidates for recognition as text. The text candidates may then be subject to optical character recognition (OCR) in the normal manner. One such method is described in, for example, an article entitled "Robust Text Detection In Natural Images With Edge-Enhanced Maximally Stable Extremal Regions" by Chen et al, believed to be published in IEEE International Conference on Image Processing (ICIP), September 2011 that is incorporated by reference herein in its entirety as background.

MSERs are believed to have been first described by Matas et al., e.g. in an article entitled "Robust Wide Baseline Stereo from Maximally Stable Extremal Regions", Proc. Of British Machine Vision Conference, 2002, pages 384-393 that is incorporated by reference herein in its entirety. The method described by Matas et al. is known to be computationally expensive and a lot of time is normally taken to identify MSERs in an image. The time taken to identify MSERs in an image can be reduced by use of a method of the type described by Nister, et al., "Linear Time Maximally Stable Extremal Regions", ECCV, 2008, Part II, LNCS 5303, pp 183-196, published by Springer-Verlag Berlin Heidelberg that is also incorporated by reference herein in its entirety.

The current inventors note that prior art methods of the type described by Chen et al. or by Matas et al. or by Nister et al. identify hundreds of MSERs in an image. Such methods sometimes identify thousands of MSERs in an image 107 that includes details of natural features, such as leaves of a tree or leaves of plants, shrubs, and bushes.

Identifying such large numbers of MSERs in today's computers, using methods of the type described above, while being accurate, takes a significant amount of time, depending on the amount of detail in portions of the image that contain natural features. The current inventors find such methods impractical for use in recognition of text by handheld devices, such as smart phones, due to inherent limitations of such devices, on computation power and memory, relative to computers. Hence, there appears to be a need for methods and apparatuses of the type described below.

SUMMARY

In several embodiments, an image is processed to automatically identify regions to be subject to optical character recognition (OCR), as follows. One or more processors make comparisons using intensities (which are non-binary) of multiple pluralities of pixels (hereinafter compared pixels) that are located at corresponding positions in the image, to identify multiple sets of positions in multiple regions. At least two compared pixels identified in a given set of positions are separated from one another by one or more skipped pixels also included in the given set. Hence, each set (among the multiple sets) may be created by including therein positions of compared pixels that are used in comparisons, and additional positions of skipped pixels that are not used in any comparisons. Skipping of pixels, to create each set, reduces computation (relative to comparisons using all pixels that are identified in a set). Although pixels are skipped in creating a set, the compared pixels and the skipped pixels together identified in each set constitute a region that is contiguous in the image.

Comparisons that are made as described above, by using intensities of the compared pixels, can be different depending on the embodiment. For example, in certain embodiments, comparisons are made between the intensity of each pixel and a common threshold intensity i that is used to identify in the image, a region Qi that is a maximally stable extremal region or MSER. In other embodiments, comparisons are made between the intensity of one compared pixel and the intensity of another compared pixel, with positions of these two pixels being separated from one another by positions of skipped pixels whose number changes dynamically, so as to make the skipping of pixels adaptive, e.g. based on a difference in intensity between similar two pixels compared in a prior iteration.

Although computation is reduced by skipping comparison of certain pixels as noted above, the number of sets which are identified may still be quite large. Hence, in several embodiments, the number of sets created by the above-described comparison of pairs of pixels is automatically reduced, by merging two or more sets of positions, when one or more predetermined tests for merger are satisfied. Specifically, in certain embodiments, a first attribute of a first region identified by positions in a first set and a second attribute of a second region identified by positions in a second set are used in a test, and when the test is found to be satisfied, the first set and the second set are merged, to form a merged set.

A test which is used to merge two or more sets can be different, depending on the embodiment. In an example of such a test, the first attribute is a first line segment which is obtained by projection of the first region in a specific direction (e.g. horizontal) on to a specific axis (e.g. y-axis), and the second attribute is a second line segment which is obtained by projection of the second region in the same direction on to the same axis, and the test checks whether the first line segment completely overlaps the second line segment (or vice versa), e.g. by comparison of endpoints of the two line segments. When such a test is met by two sets, the positions in these two sets are aggregated, by grouping them together to form the merged set, which is then stored in one or more non-transitory computer readable storage media (e.g. non-volatile memory). Depending on the embodiment, a merged set of positions (which identifies a merged region) may itself be merged with any other set of positions of the type described above, to form a larger merged set, e.g. when the same test or another such test is found to be satisfied. One or more sets of the type described above (whether or not merged) are subsequently OCR processed, in the normal manner.

OCR processing of merged sets reduces the amount of processing that would be required in normal OCR of all sets resulting from comparison of pixels (whether or not the comparison was made by skipping pixels). For example, when two sets are merged together, to form a merged set as described above, OCR processing of the merged set requires less computation than OCR processing of each of the two sets individually. Moreover, in certain languages, OCR processing of such a merged set provides more accuracy than normal OCR processing of each of the two sets individually. For example, when an image has characters in Devanagari script, OCR of a first set with one or more positions indicative of a modifier of a character (called "maatra"), and OCR of a second set with positions indicative of the character is likely to be less accurate than OCR of a merged set of positions from both the first set and the second set together indicative of the modifier and the character in combination.

It is to be understood that several other aspects of the embodiments will become readily apparent to those skilled in the art from the description herein, wherein it is shown and described various aspects by way of illustration. The drawings and detailed description are to be regarded as illustrative in nature and not as restrictive.

BRIEF DESCRIPTION OF THE DRAWINGS

FIG. 1B illustrates, in a high-level flow chart, acts 112-114 by a prior art computer in using an image from a camera operated in act 111, as illustrated in FIG. 1A.

DETAILED DESCRIPTION

Figure 1A:
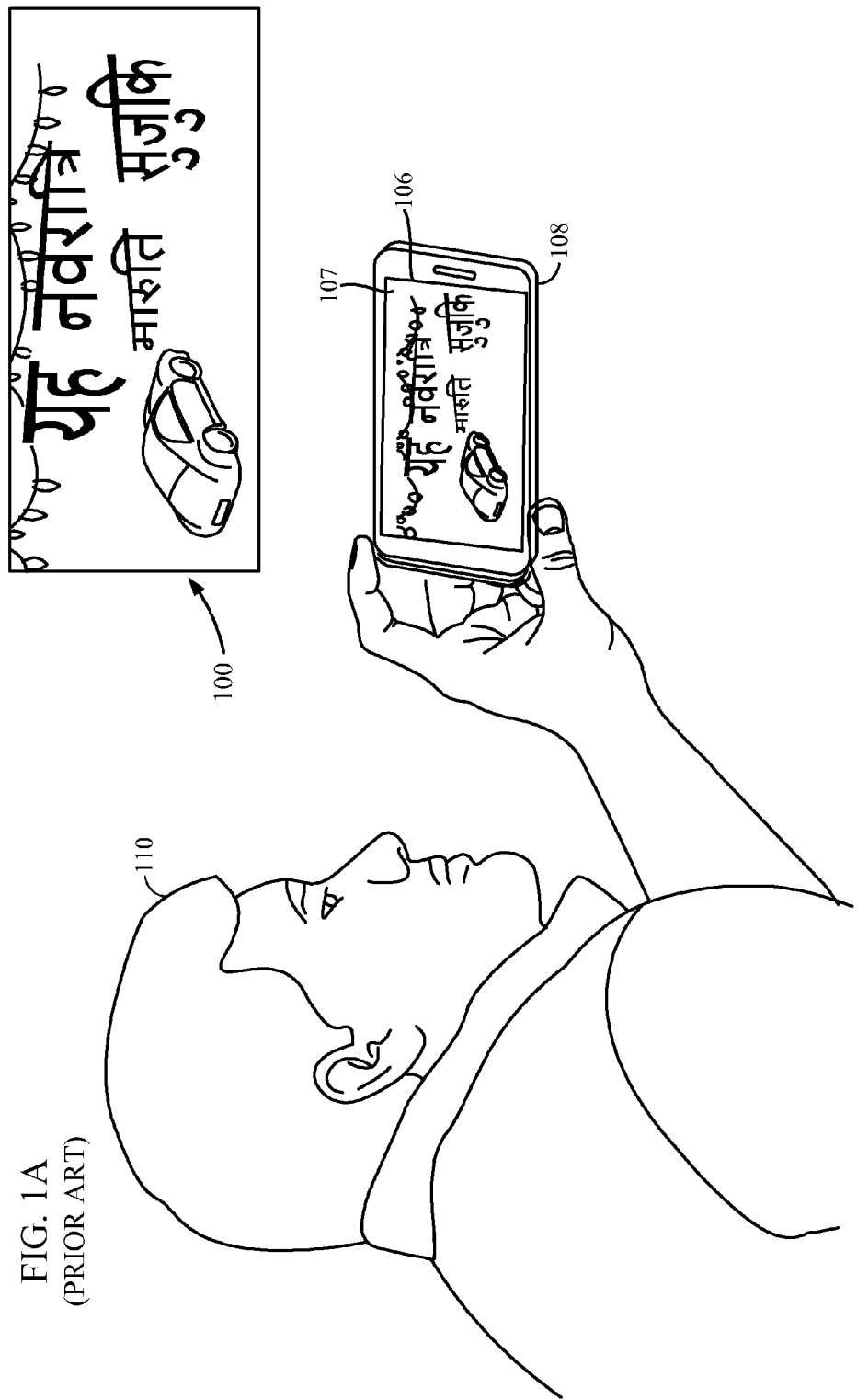
FIG. 1A illustrates a user using a camera-equipped mobile device of the prior art to capture an image of a bill-board in the real world.
Figure 2A:
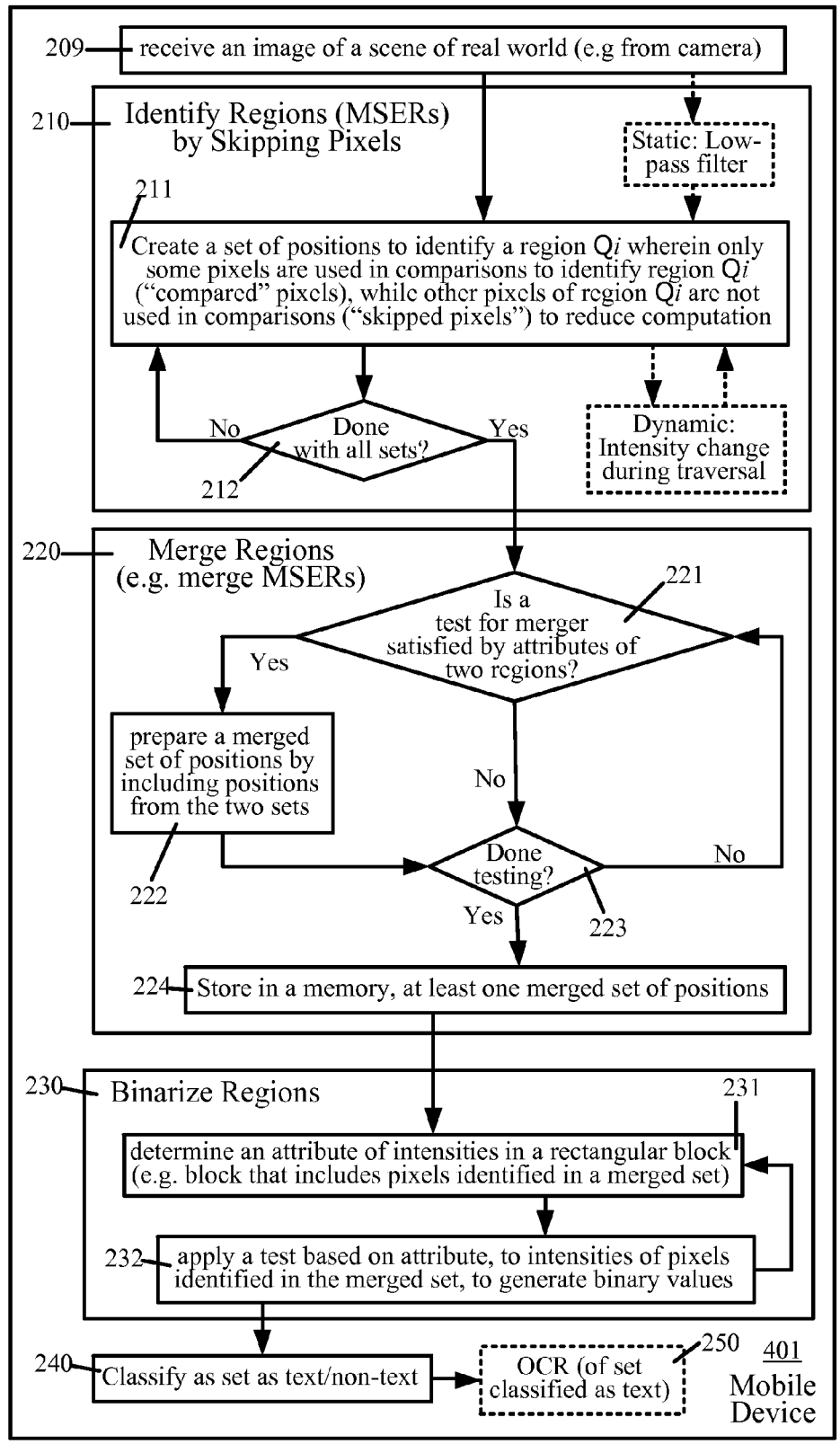
FIG. 2A illustrates, in a high-level flow chart, operations performed by processor 409 in a device 401 to identify regions by skipping pixels, merge regions, and binarize the regions in certain described embodiments.

In several aspects of the described embodiments, an image 201 (FIG. 2B) of N pixels is received by one or more processors 409 (FIG. 7) in a mobile device 401 in an act 209 (FIG. 2A) locally, e.g. from a camera 1050 (FIG. 7) within mobile device 401. The one or more processors 409 (FIG. 7) then process the image 201 (e.g. locally within mobile device 401) to identify for use in OCR: one or more regions Qi (FIG. 2B) of intensity i in image 201 by skipping pixels in an operation 210 as illustrated in FIG. 2A. Operation 210 may be performed on image 301 in a manner similar to one or more methods normally used to identify MSERs, although modified in several of the described embodiments to skip pixels to reduce computation. Hence, any conventional MSER method of the type described by Chen, or Matas or Nister (see background section, above) may be modified in certain embodiments, to perform an act 211 as follows.

Specifically, one or more processors 409 are programmed to perform an act 211 (FIG. 2A) in operation 210, to create a set of positions that identify a region Qi wherein only some pixels are used in comparisons to identify region Qi ("compared" pixels), while other pixels of region Qi are not used in the comparisons ("skipped" pixels), to reduce computation otherwise required to identify region Qi. Although skipped pixels are not used in comparisons in act 211, a set of positions created by act 211 identifies both skipped pixels as well as compared pixels, in region Qi. Depending on the embodiment, one or more pixels to be skipped (or pixels to be compared) in act 211 may be identified either statically (e.g. by use of a low-pass filter to generate image 202 of FIG. 2B) prior to act 211, or dynamically (e.g. based on intensity change occurring during traversal) in multiple iterations of act 211 performed in some embodiments to identify region Qi. To re-iterate, the comparisons and/or the creating of act 211 may be performed multiple times (e.g. in multiple directions of traversal), without using (i.e. skipping) multiple pixels ("skipped pixels") that are nevertheless included in the set of positions (in addition to positions of multiple pixels used in the comparisons).

After a region Qi has been identified by act 211, the one or more processors 409 perform an act 212 in operation 210, to check whether all sets have been created, and if not return to act 211. When act 212 determines that no more sets can be created from image 301, operation 210 is completed. Subsequently, certain described embodiments may proceed to operation 220 to merge one or more sets. Skipping of comparisons (and pixels) to create a set of positions identifying a region that may be subject to OCR reduces comparisons and related computation that would be required in normal MSER, to create the set of positions. As noted above, the above-described act 211 is performed repeatedly, to generate for the image, multiple sets of positions identifying corresponding regions Qi, . . . Rj, . . . Sk etc, wherein at least some positions in each of these multiple sets are included without comparison of intensities of respective pixels, thereby to reduce overall computation.

Although computation is reduced in skipping comparison of some pixels in each of the sets that identify regions Qi, . . . Rj, . . . Sk as noted above, the number of sets which are identified may too large, to be individually subject to OCR in mobile device 401 (which has its own limit, on processing power available therein). Specifically, as noted in the background section above, the number of such sets depends on the amount of detail in image 201 (FIG. 2B), which may include pixels of non-text indicative of objects occurring naturally in the real world, such as natural features 303 (e.g. leaves) shown at the top towards the right of FIG. 2B. Hence, in several embodiments of the type described herein, the number of sets created by the above-described operation 210 (FIG. 2A) is automatically reduced, by merging two or more sets of positions, when one or more predetermined tests for merger are satisfied.

Figure 7:
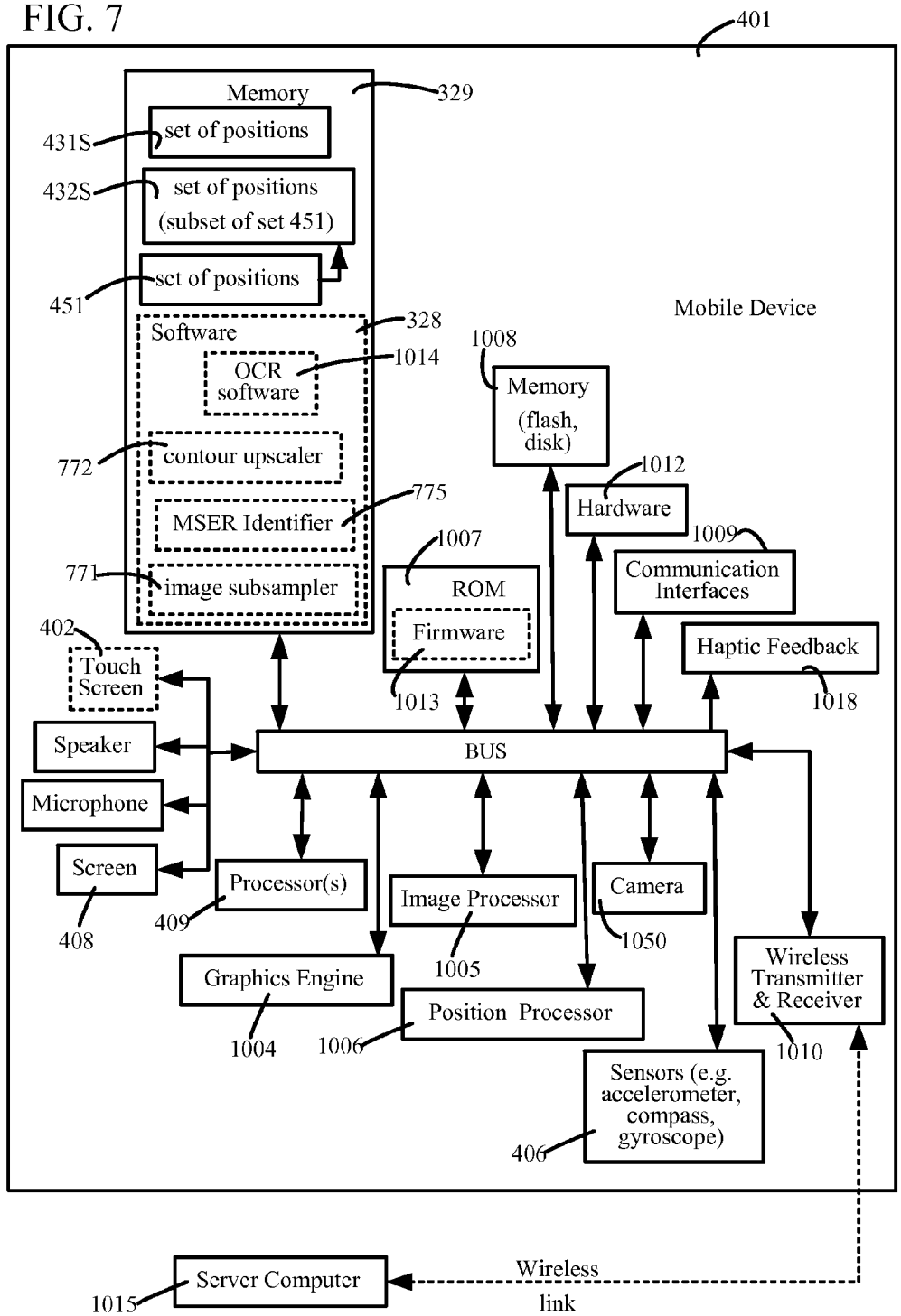
FIG. 7 illustrates, in a high-level block diagram, various components of a handheld device in some of the described embodiments.

Specifically, in certain embodiments, an operation 220 is performed to merge two regions Qi, and Rj by checking in act 221 whether a test is satisfied by attributes of these two regions. When the test is found to be satisfied in act 221, the corresponding sets of positions are merged in act 222, to form a merged set. Thereafter, act 223 checks if all regions have been checked in act 221 (including any regions identified by merged sets) and if no, then act 221 is again performed. Therefore, a merged set of positions (which identifies a merged region) created by act 222 may itself be merged with any other set of positions to form a larger merged set, e.g. when the same test of act 221 or another such test is found to be satisfied. When the answer in act 221 is yes, one or more merged sets are stored in one or more memories 329 (or other non-transitory computer-readable storage media) by one or more processors 409 (FIG. 7). A specific attribute of region Qi which is used in act 221 depends on the specific embodiment.

Sets of the type described above (whether or not merged) are thereafter OCR processed in the normal manner, which depends on the specific embodiment. Specifically, after performance of merging in operation 220, the one or more processors 409 perform operation 230 to binarize in the normal manner, intensities of pixels in image 201 at the positions identified in a set (whether or not merged). Operation 230 is followed in some embodiments by another operation 240 wherein the region is classified as text/non-text when a predetermined test is satisfied and/or by use of a neural network that has been trained. The binary values and positions of regions that are classified as text are subsequently supplied in an operation 250 to an optical character recognition (OCR) system, e.g. to identify presence in the region of one or more letters of an alphabet of a predetermined language.

OCR processing of merged sets obtained by performing the operation 220 as described above reduces the amount of processing that would be otherwise required in normal OCR of all sets that are created by comparison of pixel intensities (whether or not the comparison was made by skipping pixels). For example, when sets of two regions Qi and Rj are merged together, to form a merged set as described above, OCR processing of the merged set requires less computation than OCR processing of each of the regions Qi and Rj individually.

Figure 3A:
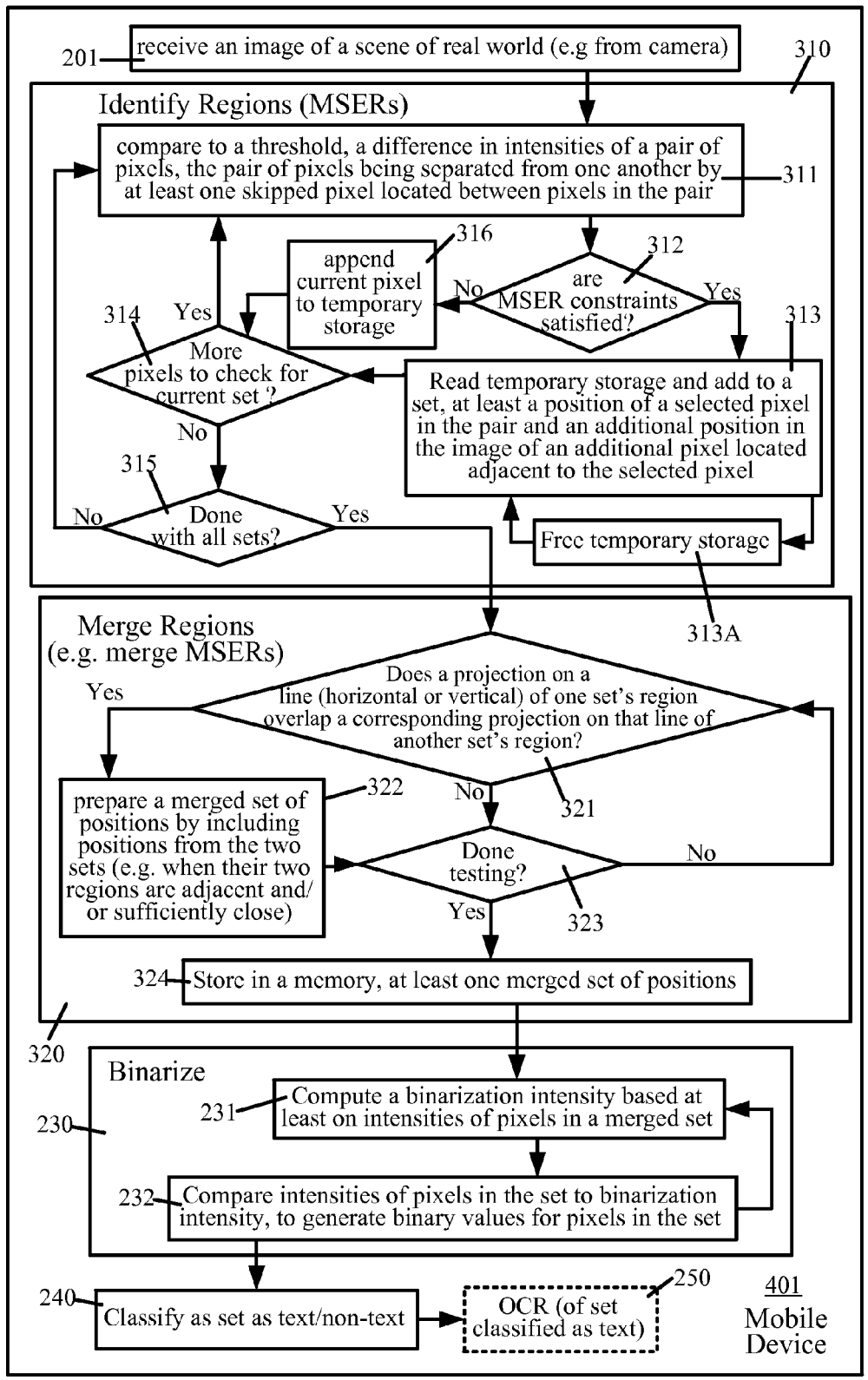
FIG. 3A illustrates, in an intermediate-level flow chart, operations performed by processor 409 in a device 401 to identify regions by skipping pixels, merge regions, and binarize the regions in several described embodiments.
Figure 3B:
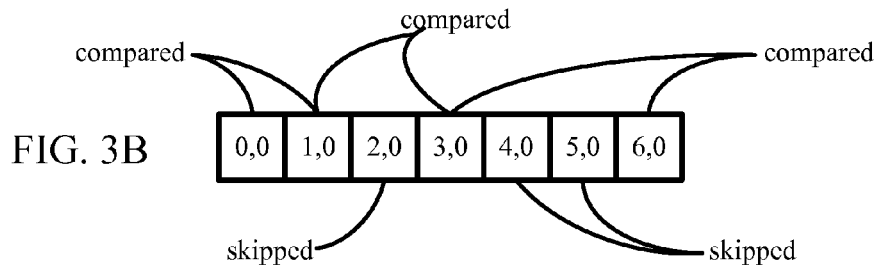
FIG. 3B illustrates compared pixels and skipped pixels in a sequence of positions (0,0) . . . (6,0) of an image, in some described embodiments.

Operation 210 of FIG. 2A may be implemented in some embodiments as illustrated by operation 310 in FIG. 3A. Specifically, in an act 311 (FIG. 3A) in operation 310, the one or more processors 409 in mobile device 401 are programmed to compare to a threshold (also called "skipping threshold"), a difference in intensities of a pair of pixels obtained from image 201. In some embodiments, act 311 is performed in a first iteration on a pair of pixels that are in contact with one another, such as pixels (0,0) and (1,0) in FIG. 3B. Act 311 is again performed in a second iteration on a pair of pixels that are separated from one another by at least one pixel located therebetween ("skipped pixel"), such as pixels (1,0) and (3,0) separated by pixel (2,0) in FIG. 3B. Thereafter, act 311 may be performed in a third iteration on yet another pair of pixels that are separated from one another by multiple pixels located therebetween (multiple "skipped pixels"), such as pixels (3,0) and (6,0) separated by pixels (4,0) and (5,0) in FIG. 3B.

Accordingly, several embodiments of the type described in the preceding paragraph skip a number D of pixels that increases at each iteration, and the increase may be a preset number δ of pixels (e.g. increase by δ=1 additional skipped pixel at each iteration), so that D increases by δ in each iteration. In other embodiments, an identical number D of pixels may be skipped in each iteration e.g. D=1 pixel may be skipped (i.e. only a single skipped pixel is located between each pair of pixels whose intensities are compared in each iteration of act 311). In still other embodiments, the number D of pixels that are skipped at each iteration may be varied, e.g. at random, or based on a change in intensity therebetween.

In certain embodiments of the type described above, a difference in intensities (which are non-binary) of a pair of pixels such as pixels (1,0) and (3,0) is compared to a threshold, wherein the pair of pixels (1,0) and (3,0) are located in the image, separated from one another by at least pixel (2,0) between them. When the threshold is found by a comparison to have been exceeded, a position of a pixel in the pair ("selected pixel"), such as pixel (1,0) is added to a set of positions that identify a region (or a portion of the region), to be subject to OCR. Also added to the set is at least one position of a pixel not used in comparison, and located adjacent to the selected pixel, e.g. skipped pixel (2,0) when it is found to satisfy MSER constraints.

Figure 2B:
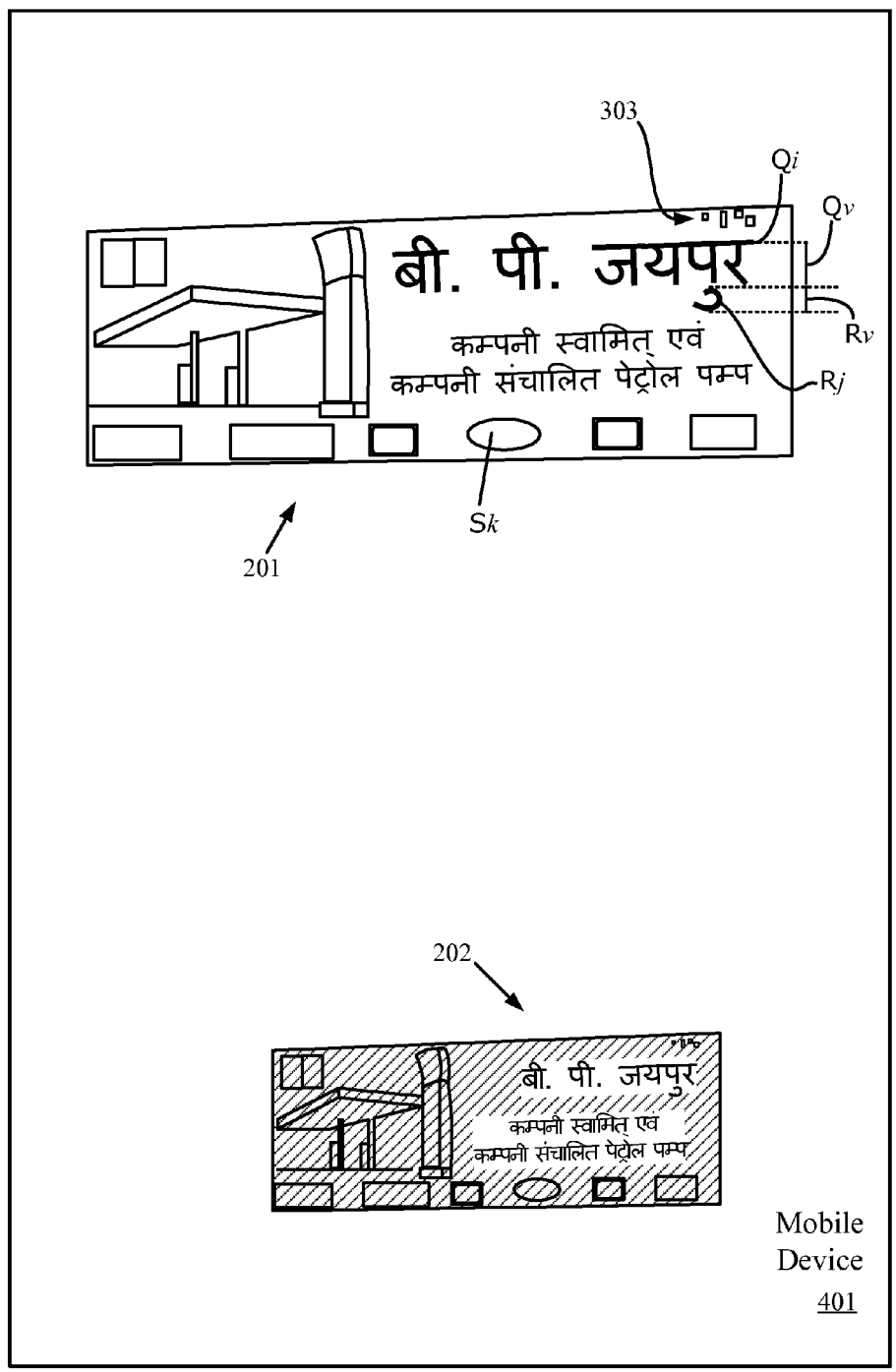
FIG. 2B illustrates a received image 201, and regions Qi, . . . Rj, . . . Sk identified by sets of positions created by operation 210 (FIG. 2A), by skipping of pixels that are omitted from a low-pass image 202 containing therein the compared pixels.

In some embodiments, image 201 is low-pass filtered and down-sampled as illustrated by image 202 (FIG. 2B). In the just-described embodiments of this paragraph, the pair of pixels whose intensities are compared in act 311 (FIG. 3A) are located adjacent to (e.g. in contact with) one another in the low-resolution down-sampled image, e.g. image 202, although pixels in the pair are separated from one another by one or more skipped pixels in the normal sized image, e.g. image 301.

Note that in most embodiments of the type described above, act 311 (FIG. 3A) is performed at least once on a pair of pixels that are separated from one another by at least one skipped pixel located between pixels in the pair. Skipping of pixels in act 311 reduces the amount of computation that is otherwise required if act 311 is performed without skipping pixels.

After performing the act 311, in act 312 in operation 310 (FIG. 3A), the one or more processors 409 in mobile device 401 check if certain predetermined constraints for identifying regions, e.g. MSER are satisfied (based on the comparison in act 311) and if not, return to act 311 (via act 314) after storing the current pixel in a temporary storage (in act 316). Processor(s) 409 confirm in act 314 that there are more pixels to check, in a current set of pixels of the image (or portion) to be visited. The temporary storage used in act 316 holds one or more pixels to be used to form a set of pixels that identify a region (in act 313, described below).

When there are more pixels to check, one or more processors 409 perform act 311 on another pair of pixels (not including the skipped pixel). If the answer in act 312 is yes, then the one or more processors 409 in mobile device 401 perform act 313 to read temporary storage and add to a set of positions (to be subject to OCR), at least a position of a pixel in the pair ("selected pixel"). In act 313 in operation 310, the one or more processors 409 also add to the set of positions, one or more additional positions (e.g. of one or more additional pixels) in normal sized image, e.g. image 301 that is/are located adjacent to the selected pixel, and saved in temporary storage (as per act 316) after which the temporary storage may be freed (as per act 313A). Depending on the embodiment, the additional pixel(s) may or may not include one or more skipped pixels.

In some embodiments, pixels identified in a set of positions (which may be implemented in a list) identify a region Qi that includes a local extrema in the image 201, such as a local maxima or a local minima. Such a region Qi may be identified in act 312 (FIG. 3A) for being maximally stable relative to one or more intensities in a range $i-\Delta$ to $i+\Delta$ (depending on the embodiment, including the above-described intensity i) used as thresholds to identify the respective regions $Qi-\Delta$ and $Qi+\Delta$ such that a local minima in the ratio $[Qi-\Delta-Qi+\Delta]/Qi$ occurs at intensity i. Therefore, the above-described set of certain embodiments identifies a region Qi that constitutes an MSER (i.e. a maximally stable extremal region).

After act 313, the one or more processors 409 perform act 314 in operation 310, to check if there are any more pixels to be checked, for the current set of positions, e.g. check if there are any more unvisited neighbors (separated by one or more skipped pixels), and if so return to act 311. If in act 313, the one or more processors 409 find that there are no more pixels to visit, then the one or more processors 409 perform act 315, similar or identical to act 212(described above).

Figure 3C:
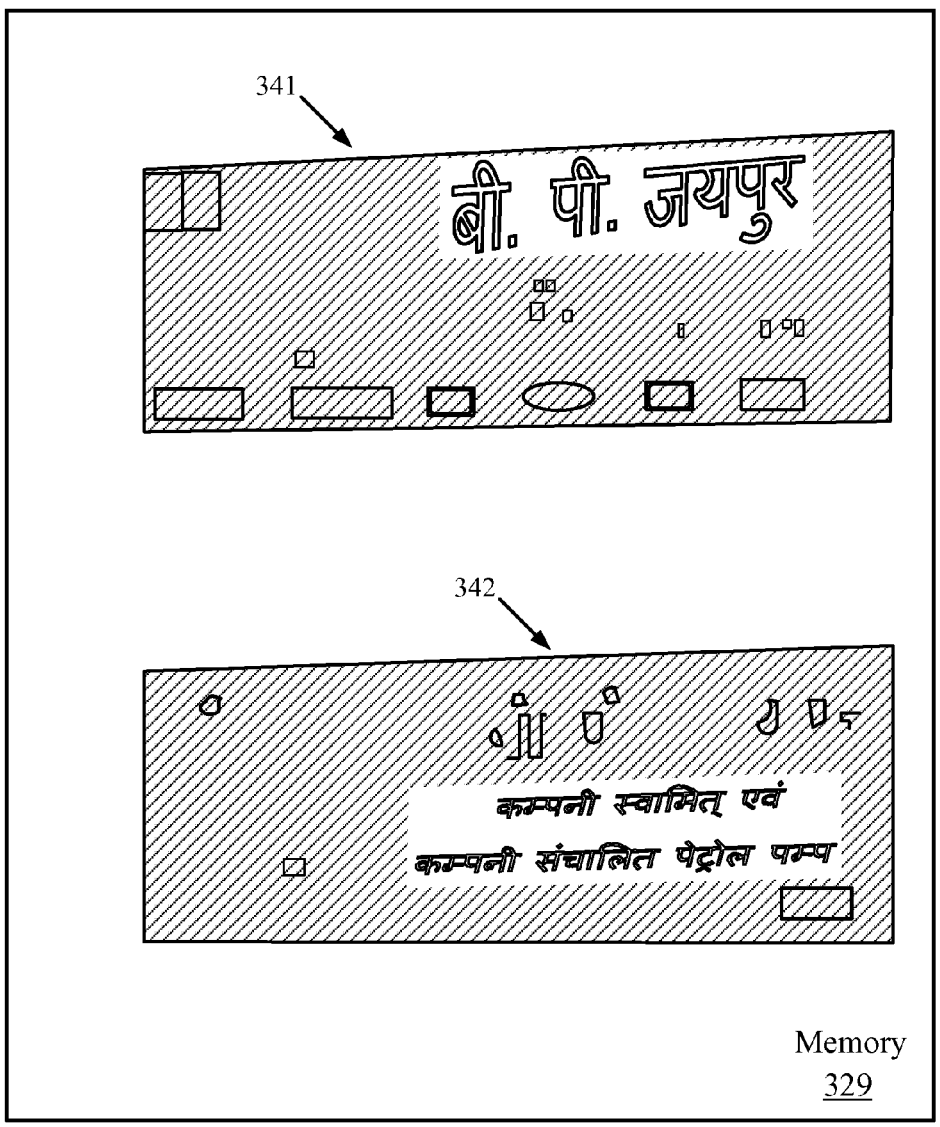
FIG. 3C illustrates MSER+ and MSER− regions 341 and 342 respectively identified in image 201 by skipping comparison of pixels in operation 210 (FIG. 2A).

In act 315 in operation 310, the one or more processors 409 check if all sets of positions that can be identified in image 301 have been identified, e.g. whether there are no more unvisited pixels in image 301 (other than skipped pixels). Typically, numerous sets of positions (e.g. tens of sets or even hundreds of sets) are identified by repeated performance of acts 311-314 described above on an image 201 (FIG. 2B). Examples of sets identified in image 301 are shown in images 341 and 342 (FIG. 3C).

Note that a region of non-text pixels indicative of natural features 303 in image 201 is now identified based on skipping pixels as described above (see FIG. 2B) has fewer sets of positions therein than regions identified in images of the prior art. If the answer is no in act 315 (FIG. 3A), then the one or more processors 409 return to act 311 to identify additional sets of positions. If the answer is yes in act 315, then the one or more processors 409 proceed to operation 320 (or alternatively to operation 220 described above), to merge two or more regions that are identified by corresponding sets of positions.

Specific acts performed during merging in operation 320 can be different in different embodiments, although acts 321-324 illustrated in FIG. 3A are performed in some embodiments as follows. In act 321, the one or more processors 409 of some embodiments check whether a test is satisfied by a first attribute of a first region Qi identified by positions in a first set of positions and a second attribute of a second region Rj identified by positions in a second set of positions. In several embodiments, one or more attributes of a rectangular block fitted around each region Qi are used in the test of act 321, such as: (1) dimension (e.g. width and/or height) of the rectangular block, and (2) position of the rectangular block. In an example of such a test, a first line segment Qv (also called "vertical span") is obtained by projection of a first region Qi in a specific direction (e.g. horizontal) on to a specific line (e.g. y-axis), and a second line segment Rv (another "vertical span") is obtained by projection of a second region Rj, in the same direction on to the same line.

In FIG. 2B, for convenience of illustration, line segments Qv and Rv are both are obtained by projection onto the same vertical line (e.g. y-axis), e.g. as largest and smallest y-coordinates of the respective blocks. The test of act 321 checks whether first line segment Qv completely overlaps the line segment Rv (or vice versa), e.g. by comparison of y-coordinates of the two line segments. When a predetermined test of the type just described is met in act 321, the positions in the two sets identifying the two regions Qi and Rj may be aggregated, by grouping them together to form the positions of a merged set.

In some embodiments, in addition to the just-described checking of overlap, the test of act 321 may additionally check other conditions, e.g. proximity of the two regions Qi and Rj in the direction of the projection (in this example, proximity in the horizontal direction, or along the x-axis). For example, the test of act 321 may check whether a block that contains region Rj is located immediately above, or below, or to the left, or to the right of a block that contains region Qi with no intervening block therebetween. When the test of act 321 is satisfied, these two blocks of regions Qi and Rj are merged. Additional tests for merger of two adjacent blocks of regions Qi and Rj may be based on, for example, relative heights of the two blocks, and/or aspect ratio of either or both blocks.

Figure 3D:
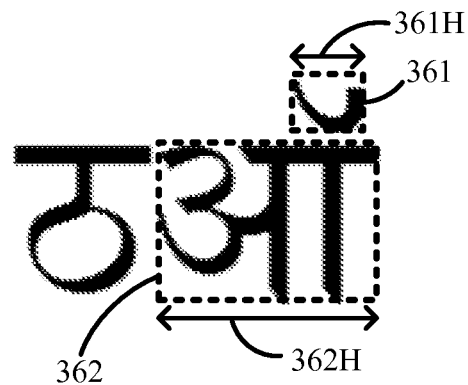
FIGS. 3D, 3E and 3F illustrate regions being merged in accordance with operation 220 in FIG. 2A.

In one example illustrated in FIG. 3D, the attributes are horizontal projections, such as span 361H and span 362H of blocks 361 and 362 that are rectangular and may be obtained by fitting rectangles around positions in respective sets generated by acts 221-224. In an example shown in FIG. 3D, the test is to check whether the spans overlap and whether the blocks are adjacent to (and/or not separated by greater than a specified distance from) one another. In this example, span 361H (FIG. 3D) is completely overlapped by span 362H, and the blocks 361 and 362 have no intervening block therebetween and so they are horizontally overlapped and vertically adjacent, hence the test is satisfied.

Figure 3E:
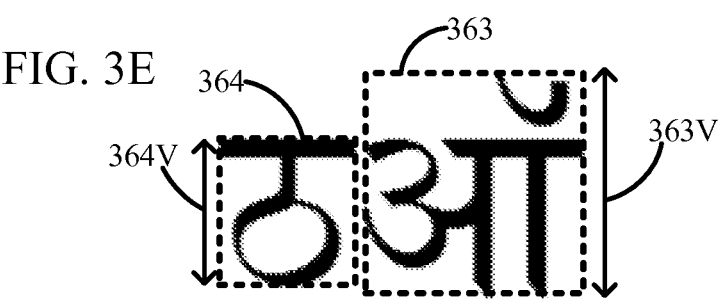
Figure 3F:
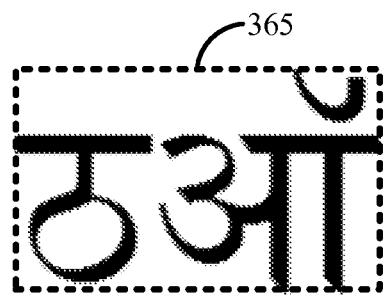

When the test is satisfied in act 321, the one or more processors 409 go to act 322 to prepare a merged set of positions, by including therein positions in the first set and positions in the second set. For example blocks 361 and 362 shown in FIG. 3F are merged in act 322 to generate block 363. On completion of act 322, the one or more processors 409 go to act 323 to check if such testing is completed, e.g. if all tests have been made and/or all regions tested and if the answer is no, control returns to act 321. If the answer is yes, then one or more merged sets of positions are stored, as per act 324 in a memory 329 (FIG. 7) of mobile device 401, thereby to complete the merging in operation 320.

In several embodiments of the type described above, two regions Qi and Rj that are merged with one another are both identified by skipping pixels. However, in other embodiment only one of regions Qi and Rj is identified by skipping pixels while the other of regions Qi and Rj is identified without skipping pixels.

For text expressed in certain natural languages (such as Hindi), OCR processing of a merged set which is created as described above may provide more accuracy than normal OCR processing of each of the two sets individually. For example, when an image has characters in Devanagari script, OCR of a first set with one or more positions indicative of an accent mark (called "maatra") 361 (see FIG. 3D), and OCR of a second set with positions indicative of a core character in block 362 (see FIG. 3D) is likely to be less accurate than OCR of a merged set of positions included in a block 363 (FIG. 3E), with the accent mark and the core character together. As another example, when an image has two or more characters in blocks 363, 364 (FIG. 3E) adjacent to one another that form a word, OCR of a merged set indicative of a region 365 (FIG. 3F) with the multiple characters together is likely to be more accurate than OCR of blocks 363 and 364 individually (as each of them may or may not contain text regions, i.e. may contain non-text regions such as graphics).

Note that the number of skipped pixels is determined in some embodiments illustrated in FIGS. 2A and 3A, as a downsampling factor D. Also, note that the downsampling factor D may be adaptively determined in some embodiments as described below in reference to FIG. 5.

Figure 4A:
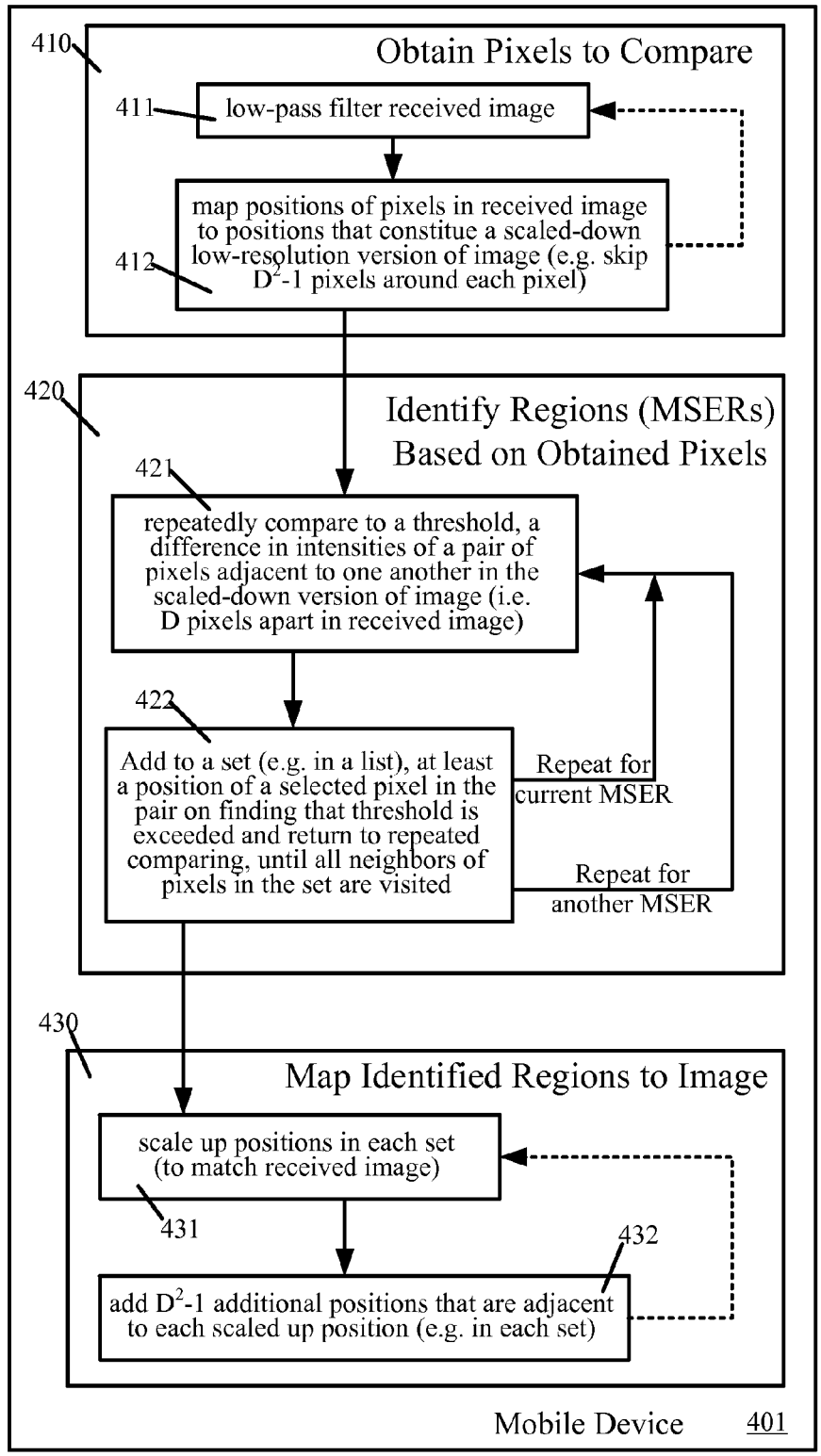
FIG. 4A illustrates, in a flow chart, operations performed by processor 409 in operation 210 (FIG. 2A) of some embodiments, to identify regions by skipping pixels in multiple directions of traversal, in some described embodiments.

In some embodiments, skipping of pixels during comparison in act 211 (described above) is performed by obtaining the pixels by performance of an operation 410 (FIG. 4A). In several such embodiments, the image 201 is first low-pass filtered (in act 411) followed by mapping positions (as per act 412) in image 201 which is of normal size, to positions that constitute an image 202 which is a scaled-down version having low resolution (e.g. which is omitting or skipping $D^2-1$ pixels around each pixel). Omission of $D^2-1$ pixels that are adjacent to every pixel D pixels apart (as per act 412) occurs when image 201 is downsampled in its entirety e.g. by a factor D (also called "subsampling factor").

However, image 202 which is a low pass image need not be generated in some embodiments which simply perform a mapping to identify positions of $N/D^2$ pixels in the image 201 of normal size, as constituting the image 202. Moreover, although image 201 is low-pass filtered (as per act 411) prior to mapping (as per act 412) in some embodiments, other embodiments may directly perform such mapping without low-pass filtering.

Figure 4B:
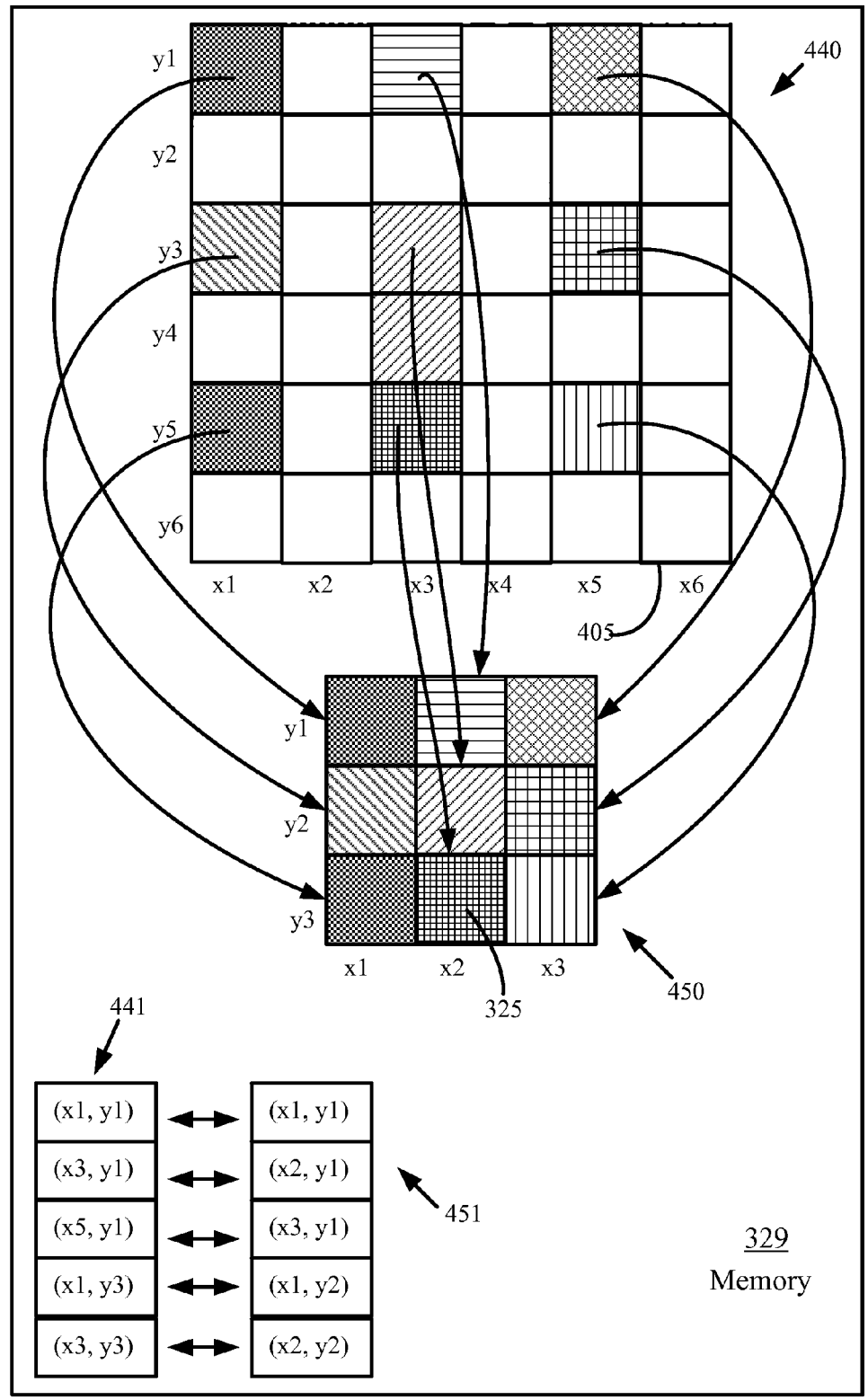
FIGS. 4B, 4D illustrate pixels after processing in accordance with acts 412 and 432 respectively in FIG. 4A.

Omission of $D^2-1$ pixels is illustrated in an example shown in FIG. 2B, wherein image 201 is scaled down to image 202 using a subsampling factor D of value 2. In one illustrative example, starting with a pixel in image 440 shown in FIG. 4B at location (x1, y1), its three surrounding pixels at locations (x1, y2), (x2,y2) and (x2, y1) are omitted from a set 441 (see bottom left of FIG. 4B; implemented as a list) of positions in image 440. This pixel (at location (x1, y1) in image 440) is further mapped to a corresponding pixel at location (x1, y1) in set 451 (e.g. stored in memory 329) of positions in scaled-down image 450. This process is repeated with the pixel at location (x3, y1) in set 441 being mapped to location (x2, y1) in set 451, and again repeated for pixel at location (x5, y1) in set 441 being mapped to location (x3, y1) in set 451, etc. until the first row (of image 440) is completed. This process is similarly repeated for multiple rows (of image 440), until all pixels in image 440 have been either mapped or skipped in set 441, thereby to yield the set 451.

The scaled-down image 450 identified by positions in set 451 is then used in operation 420 (FIG. 4A) to identify regions that differ from any portion(s) of the image surrounding the regions (either whole or in part). The regions identified in the scaled-down image 450 are typically identified (as per acts 421 and 422 in FIG. 4A) for internally having at most a monotonic transformation in property value (e.g. increasing or decreasing by 1 in grey scale between adjacent pixels), but at the boundaries having a larger change in the property value. Depending on the embodiment, such regions can be identified by processing the scaled-down image 450 using any method, such as any one of the MSER detection methods known in the prior art.

Figure 4C:
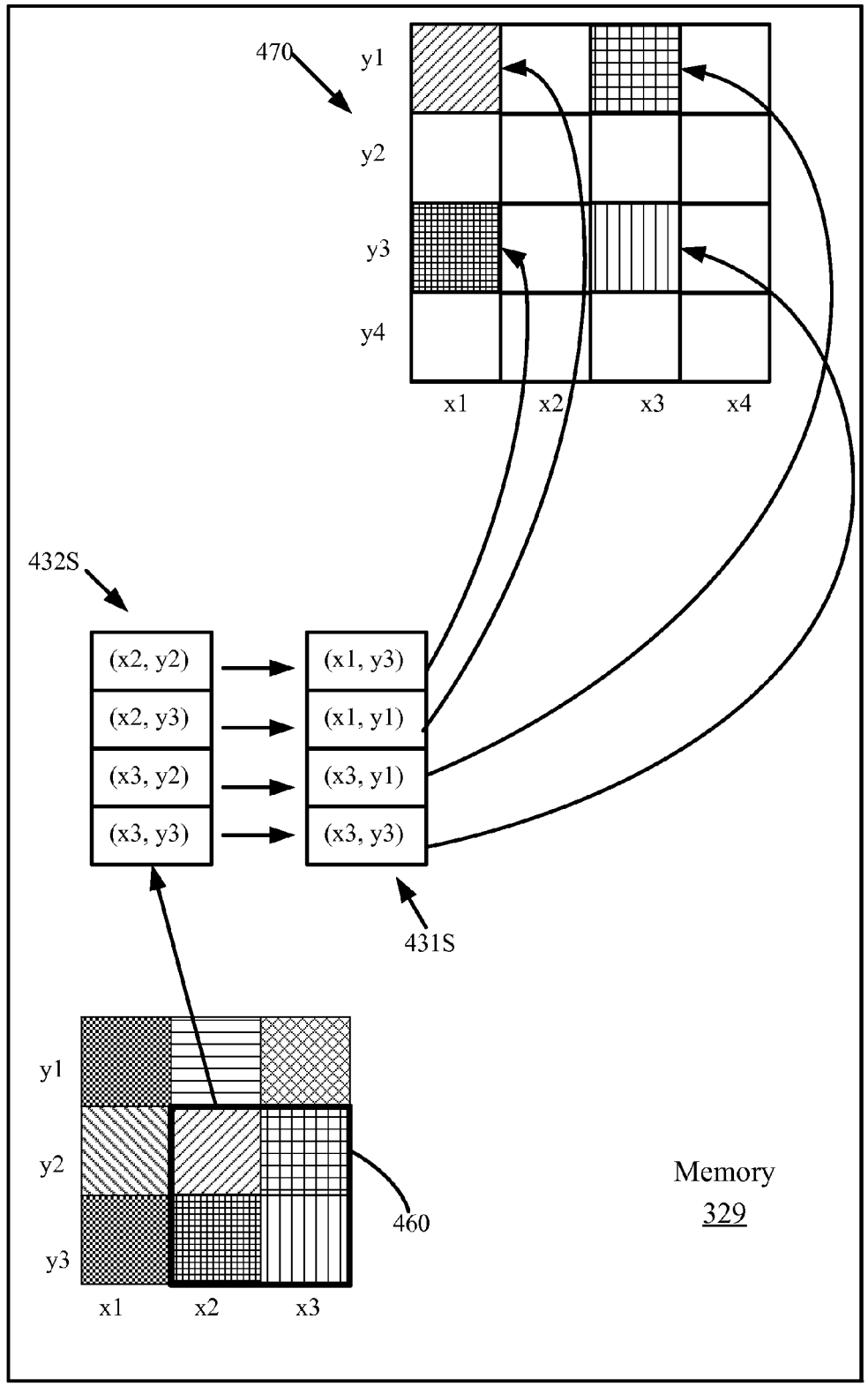
FIG. 4C illustrates positions and pixels after processing in accordance with acts 421 and 422 respectively in FIG. 4A.

An example of a region that results from operation 420 is shown in FIG. 4C as region 460, identified from within scaled-down image 450. Region 460 is typically identified, on completion of operation 420, by positions in set 432S (e.g. stored in memory 329) which is actually a subset of the set 451 (described above). In this example, set 432S includes the following positions: (x2, y2), (x2, y3), (x3, y2) and (x3, y3). One or more regions identified by operation 420 from within scaled-down image 450, for differing from their surrounding are then mapped back to the image 440 of normal size, in an operation 430 (FIG. 4A). Specifically, in some embodiments, positions in set 432S of pixels in the identified region, e.g. region 460 are scaled up as per act 431. For example, positions in set 432S are scaled up by subsampling factor D in each of two dimensions (x, y), in act 431. Hence, in act 431, each position at an original location (x, y) in the identified region, e.g. region 460 resulting from operation 430 is moved to a new location (D*x, D*y), thereby to generate a portion of set 431S (FIG. 4C), D being the subsampling factor.

Figure 4D:
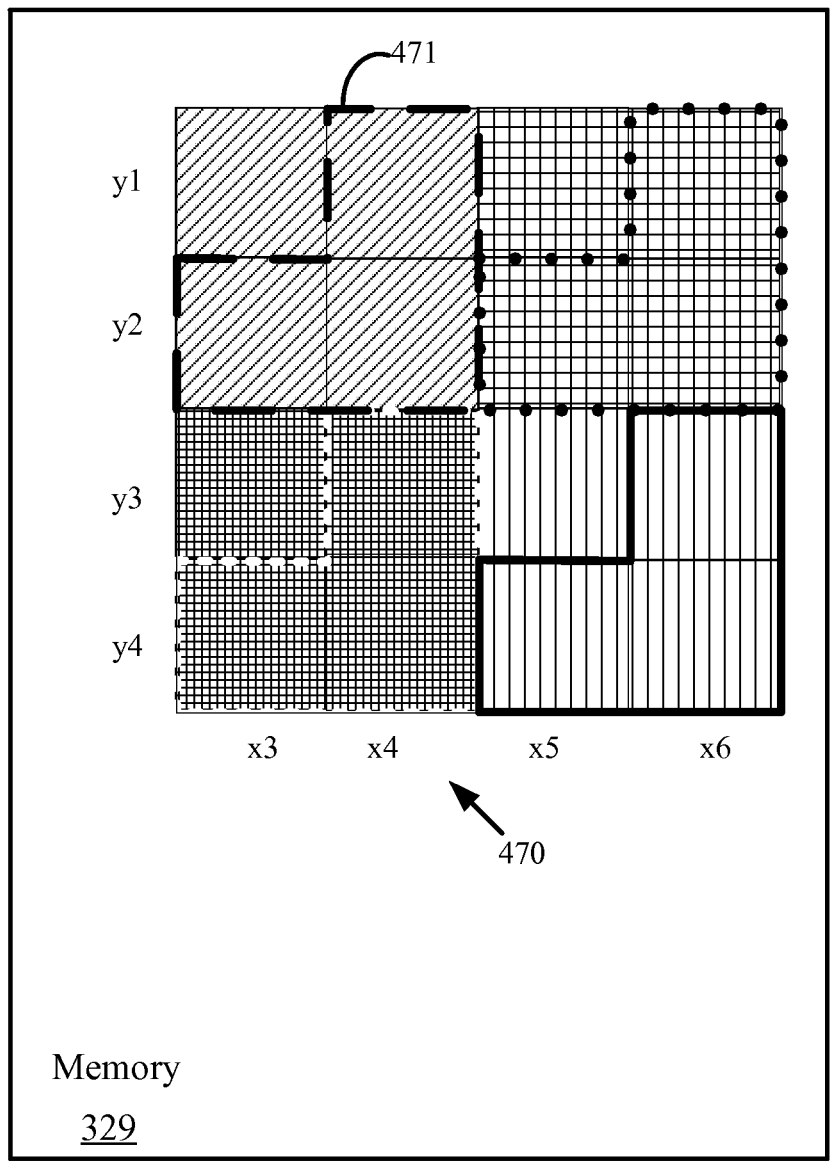

The rest of set 431S is generated in act 432 in FIG. 4A, wherein each position in the region 460 (FIG. 3D) is supplemented by addition of $D^2-1$ positions adjacent thereto, in region 470 that now includes $D^2$ positions for each position in scaled-down region, e.g. region 460. Creation of region 470 (also called "upsized" region) is illustrated in an example shown in FIG. 4D. Specifically, for a pixel at an original location (x3, y3) in the upsized region, e.g. region 470 (FIG. 4C) which is being supplemented, new pixels 471 that are $D^2-1$ in number are now added, for example at locations (x3, y4), (x4,y4) and (x4, y3) in FIG. 4D. The above-described process of adding new positions is repeated, for each position in set 432S, thereby to obtain an upsized region, e.g. region 470 (FIG. 4D).

In some embodiments, positions of the $D^2-1$ pixels are not obtained by interpolation and instead these positions are simply selected in a predetermined manner, for example, to form a square of positions that are $D^2$ in number in region 470, in one example with a position being supplemented located at a top left corner of the square, or in another example the position being supplemented located at a center of the square (when the value of D is odd). Accordingly, the set 431S (e.g. stored in memory 329) of positions in image 440 (FIG. 4B) of normal size, which are created based on positions in set 432S of scaled-down image 450, represent an identified region, e.g. region 470 of image 440, which may be, for example, an MSER. Hence, region 470 in image 440 is similar to the above-described regions identified for image 201, as illustrated in FIG. 2B.

In some embodiments, region 470 is then classified as text or non-text in operation 240 followed by input to an operation 250 (FIG. 2A) that performs optical character recognition (OCR). For example, locations of pixels in region 470 and their property values (e.g. intensities) are used together as a connected component, to check that one or more rules (which may be based on geometry) are satisfied (e.g. aspect ratio is below a preset limit, presence of a line of pixels in a block within a specified relative height, called "shiro-rekha" for text in Devanagari script, etc), followed by optical character recognition (OCR) decoding (e.g. generating a vector based on the connected component, and comparison to a dictionary of pre-computed vectors to identify a character). In performing such text recognition, certain alternative embodiments use only locations but not property values of pixels that are identified in upsized region, e.g. region 470. In such alternative embodiments, property values of corresponding pixels at the same locations in region 405 of image 440 are used.

Figure 4E:
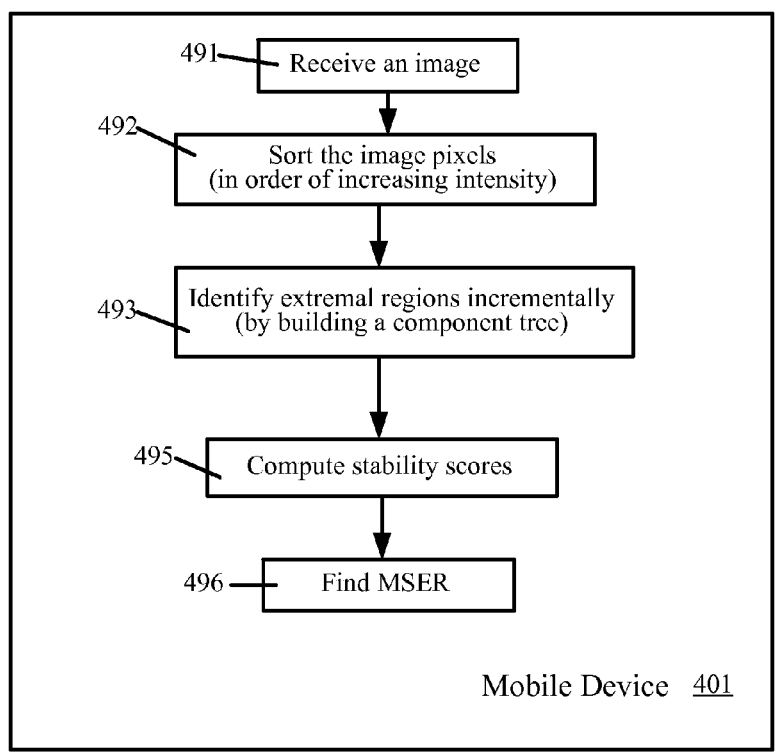
FIG. 4E illustrates, in an intermediate-level flow chart, operations performed in certain described embodiments to use a threshold intensity i to identify a region Qi that is a maximally stable extremal region or MSER.

Certain embodiments perform acts illustrated in FIG. 4E, to find MSERs using a method of the type described by Matas et al., e.g. in an article entitled "Robust Wide Baseline Stereo from Maximally Stable Extremal Regions" incorporated by reference above. Hence, several acts of such methods, that are not expressly described herein are similar or identical to corresponding acts described by Matas, et al. Specifically, an image is received in act 491, followed by sorting of all pixels in the image in the order of increasing intensity in act 492. Act 492 is followed by identification of extremal regions incrementally, by building in act 493, a tree of components, wherein pixels within each component are connected to one another ("connected component"). Note that in act 493, comparisons involving D pixels are skipped, as described above. After act 493, stability scores are computed in act 495, followed by finding one or more Maximally Stable Extremal Regions (MSERs) in act 496 (FIG. 4E).

In several embodiments, a value of the above-described subsampling factor D is known ahead of time (e.g. value 2 or 3 is predetermined) and this value is used in subsampling the entire image (e.g. in image subsampler 771 in FIG. 7). Use of a scaled-down image in generation of contours reduces memory and processing power requirements by $1/D^2$ relative to linear-time MSER methods (e.g. performed by MSER Identifier 775 in FIG. 7) when using a normal-sized image. The just-described $1/D^2$ savings significantly offset (e.g. offset by an order of magnitude) the extra processing and memory used in subsampling the normal-sized image and upsampling the scaled-down contours (e.g. in a contour upsampler 772 in FIG. 7). For example, in some embodiments, downsampling an image by subsampling factor D equal to 2, reduces the size of the image by a factor of 4. In several such embodiments, as intensity values in an upsized region is eventually converted to binary (value 0 or value 1) during text recognition, the low pass filtering inherent in downsampling is an acceptable tradeoff to gain processing speed and reduced memory in a handheld device.

Performing OCR on such binary values, which have been generated by skipping pixels as described above, is unexpectedly found to be more effective than OCR on regions identified by using all pixels, i.e. more effective than including skipped pixels when identifying a region. Skipping of pixels to identify regions as described above eliminates certain regions ("non-text regions") that may otherwise be identified, but result in unnecessary work by the OCR system. Also, intensities of pixels that are neighbors to one another within such non-text regions may not be as uniform relative to one another, as in regions identified by skipping pixels. Skipping pixels as described herein not only eliminates some non-text regions, but also improves speed because fewer regions are identified, classified as text, and supplied to the OCR system.

In certain embodiments, subsampling and contour generation are performed independent of one another, with subsampling being performed on an entire image, followed by MSER identification being performed on the scaled-down image as described above. In other embodiments, MSER identification and subsampling are performed incrementally and iteratively within an image, so a value of subsampling factor D for a next iteration is calculated dynamically based on properties of pixels that surround a pixel in a current iteration (also called "current pixel"), as illustrated in FIG. 5 and described below.

Figure 5:
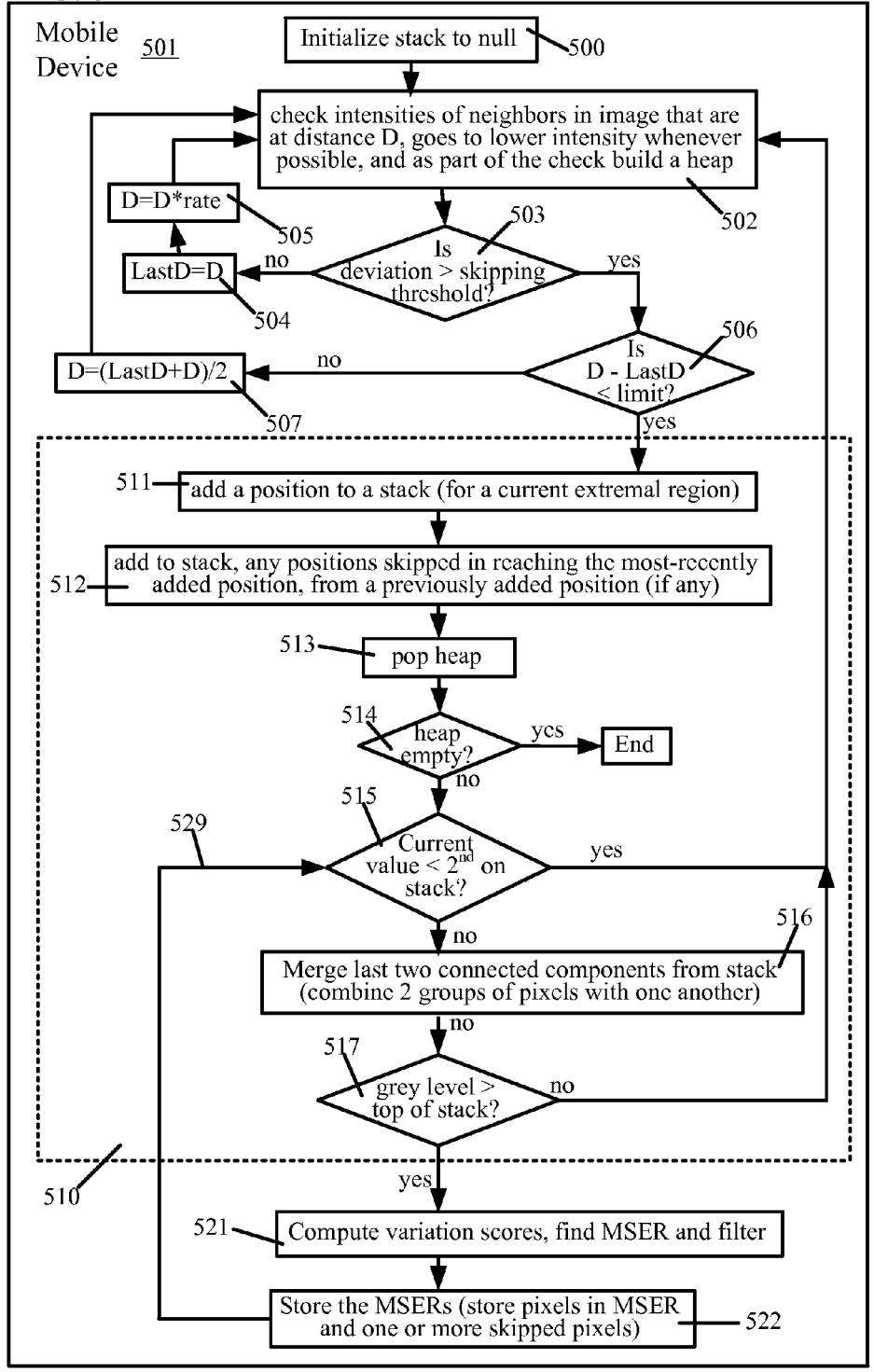
FIG. 5 illustrates, in a low-level flow chart, operations performed by processor 409 in a device 401 to identify regions by adaptively skipping pixels, in several described embodiments.

Specifically, certain embodiments of the type illustrated in FIG. 5 are based on one or more acts in a method of the type described by Nister, et al., in the article entitled "Linear Time Maximally Stable Extremal Regions" incorporated by reference above. Hence, several acts of such methods that are not expressly described herein are similar or identical to corresponding acts described by Nister, et al.

Several embodiments of the type illustrated in FIG. 5 (described below) determine a value of D at each iteration adaptively, e.g. based on a difference between a maximum intensity value and a minimum intensity value (also called "deviation"), among pixels that are located adjacent to and/or around a current pixel (which at this stage is a "starting" pixel). For example if an adjacent pixel (in a current direction of traversal) is of the same intensity level as the starting pixel then a pixel that is 2 pixels away is checked and if that pixel is also at the same intensity level then another pixel that is 4 pixels away is checked (thereby skipping the third pixel), and if that pixel is also at the same intensity level then yet another pixel that is 8 pixels away is checked (thereby skipping the pixels 5, 6 and 7) and so on, until a pixel ("too-far" pixel) is identified that is x pixels away wherein the intensity level changes (relative to a most-recently checked pixel) by more than a predetermined threshold. In response to finding such a change, such embodiments may then return, from the too-far pixel to the last-visited pixel and repeat the process by skipping fewer pixels (in the current direction of traversal) from the last-visited pixel to eventually find a pixel ("ending" pixel) at which the transition actually occurs. Then, positions of all pixels between the starting pixel and the ending pixel are added to the set of positions, and the process is repeated from the starting pixel, in a different direction of traversal.

Hence, a count of pixels, between a current pixel and a pixel whose intensity is being compared in adaptive downsampling changes depending at least partially on the predetermined threshold being not exceeded by the deviation. So, deviation is filtered spatially to determine the amount of down-sampling that can be done. Other adaptive downsampling approaches that could work are to derive other statistics that quantify variation. An example is the ratio of the frequency response at Fs/2 to the response at DC. This is simply the ratio: H(Fs/2, Fs/2)/H(0,0). In some embodiments, H is the 2-D discrete Fourier transform. In some adaptive downsampling embodiments, the down-sampling rate is kept constant at least in a small region so that the complexity of dealing with varying down-sampling rates does not become too high.

In some embodiments that perform adaptive downsampling, a processor 409 starts in act 500 (FIG. 5) by initializing a stack to null. Next, in act 502, processor 409 checks intensities of neighbors of a current pixel (that may be chosen initially at random, for example). In act 502, the neighbors which are checked by processor 409 are typically at a distance D away from the current pixel, wherein D is initially chosen to be, for example, 1. Hence, in the example illustrated in FIG. 4B, if the current pixel is (x2,y2), then in act 502 processor 409 checks intensities of its neighbor (x3,y2), e.g. when the direction of traversal is to the right (e.g. initially). In act 502, on completion of the check, processor 409 goes to a pixel of lower intensity whenever possible. Additionally, as part of the check in act 502, processor 409 builds a heap, using the following logic. If (neighbor value<current pixel value): Put the current pixel on the heap, and move to the neighboring pixel (at D steps) which has not been visited yet, else: Put the neighboring pixel in the heap. During buildup of the heap in act 502, the heap holds a path, showing a history of pixels that were (at some time) the current pixel.

Thereafter, in act 503 (FIG. 5), processor 409 checks if deviation in intensity between the current pixel (x2,y2) and its neighbor (x3,y2) is greater than a preset number, hereinafter referred to as a skipping threshold. The skipping threshold of some embodiments is made proportional to the parameter $\Delta$, so that higher values of $\Delta$ allow higher deviation in intensity while skipping pixels, and vice versa. So the skipping threshold may be made to be, for example, function of $\Delta$ and ideally less than $\Delta$. One specific setting for skipping threshold can be 0.5*$\Delta$.

If the answer in act 503 is no, processor 409 goes to act 504 to save the value of D (in the variable LastD), and then goes to act 505 to increase the value of D, e.g. by multiplying it by a predetermined rate (which may be 2, for example). The increased D is then used in performing the act 502 (described above). When the answer in act 503 is yes, processor 509 goes to act 506 to check if the difference between D and LastD is less than a limit, and if the answer is no then processor 509 goes to act 507. In act 507, the value of D is reduced, e.g. to the value (D+LastD)/2, and then act 502 is again performed. If the answer in act 506 is yes, then a local minima has been found, and therefore processor 409 starts an operation 510 to create a set of positions that is to identify an MSER, as described next.

Specifically, in act 511 of operation 510, processor 409 adds the current pixel's position to a stack, to start creating a set for a current extremal region. Then, in act 512, processor 409 adds to the stack, any positions in the image of pixels that were just skipped in reaching the most-recently added position, from a previously added position (if any pixels were skipped). Subsequently, processor 409 pops the heap in act 513 and checks in act 514 if the heap was empty. If the answer in act 514 is yes, then operation 510 ends, and creation of the set of positions, to identify an MSER is completed, and the set is stored in memory.

If the answer in act 514 is no, then act 515 is performed to check if a value of intensity of the current pixel (which has just been obtained, by popping the heap) is less than the pixel of the $2^{nd}$ component on the stack. In act 515, if the answer is yes, then processor 409 returns to act 502 (described above). If the answer in act 515 is no, then processor 409 goes to act 516, to merge the last two connected components from the stack. Then processor 409 goes to act 517, to check if the grey level of the current pixel is greater than a pixel at the top of the stack. If the answer in act 517 is no, processor 409 returns to act 502 (described above). If the answer in act 517 is yes, operation 510 is completed.

After completion of operation 510, processor 409 performs acts 521-522 of the type described by Nister et al. Specifically in some embodiments, in act 521, processor 409 computes variation scores, followed by finding an MSER, followed by filtering. Then in act 522, processor 409 stores in memory 329 one or more MSERs, by storing pixels that have been determined to be included in an MSER as well as any pixels located between the just-described pixels and were skipped. After act 522, processor 409 returns to act 515 as shown by branch 529, so the process from act 515 to act 522 continues as long as current value of a pixel popped up from the heap is not less than the pixel value of second component in the stack.

Certain embodiments use a discrete wavelet transform (DWT) to determine a value of the downsampling factor D. An example (not shown) uses two dyadic CDF 5/3 wavelet stages of a predetermined image (called Castle image), used to identify regions with almost zero edge information (which, depending on the embodiment, are down-sampled with a high value of factor D, e.g. value 8, or even completely segmented out), from regions where edge information is clearly preserved across one or even both levels of the Wavelet decomposition (which are down-sampled at a low value of factor D, e.g. value 2). The ith level of the dyadic wavelet decomposition produces sub-bands down-sampled by 2i. Note that certain image portions containing prominent high frequency content may also be down-sampled significantly, because the edge information is sufficiently preserved at the lower resolutions as well, as observed in the three smaller "edge-map" images. Another benefit of using the discrete wavelet transform (DWT) is that in some embodiments the (Low, Low) frequency sub-band at various stages of the wavelet decomposition is automatically used as a down-sampled image at certain resolution, and an MSER method is run directly on the portions of these down-sampled images.

Figure 6:
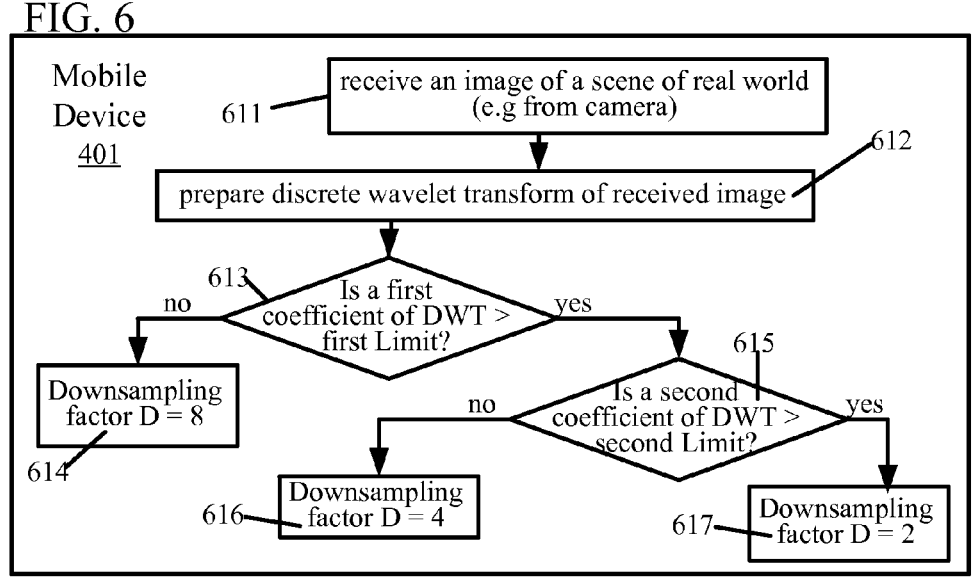
FIG. 6 illustrates, in a low-level flow chart, operations performed using Discrete Wavelet Transform (DWT), to determine a down-sampling rate D used in certain described embodiments, to skip comparison of D pixels.

Accordingly, some embodiments of mobile device 401 perform acts 611-617 as illustrated in FIG. 6, to determine a downsampling factor D (also called down-sampling rate) that is thereafter used as described above in reference to FIGS. 2A, 3A, 4A, 4E and 5. Specifically, a natural image, such as image 201 described above, is received in act 611 by one or more processors 409 in mobile device 401 that then use this image to prepare a discrete wavelet transform in act 612. Next, one or more processors 409 check if a first coefficient of the DWT (generated in act 612) is greater than a first predetermined limit, and if the answer is no then the downsampling factor D is set to the value 8 in act 614. If the answer in act 613 is yes, then the one or more processors 409 go to act 615 to check if a second coefficient of the DWT is greater than a second predetermined limit, and if so then act 617 is performed to set the downsampling factor D to the value 2 and alternatively an act 616 is performed to set the downsampling factor D to the value 4. The first and second predetermined limits are obtained, in some embodiments, from empirical data, e.g. based on experimentation on natural images.

Mobile device 401 of some embodiments that performs the method shown in FIG. 2A is a mobile device, such as a smartphone that includes a camera 1050 (FIG. 7) of the type described above to generate an image of a real world scene that is then processed to identify any text therein. As noted above, mobile device 401 may further include sensors 406 that provide information on actual movement of mobile device 401, such as an accelerometer, a gyroscope, a compass, or the like. Mobile device 401 may use an accelerometer and a compass and/or other sensors to sense tilting and/or turning in the normal manner, to assist processor 404 in determining the orientation and position of text in an image captured in mobile device 401. Instead of or in addition to sensors 406, mobile device 401 may use images from a camera 1050 to assist processor 404 in determining the orientation and position of mobile device 401 relative to the text being imaged. Also, mobile device 401 may additionally include a graphics engine 1004 and an image processor 1005 that are used in the normal manner. Mobile device 401 may optionally include contour upsampler 352, MSER Identifier 355 and image subsampler 351 (e.g. implemented by a processor 404 executing software in memory 329) to identify letter candidates for input to OCR software 1014 (when executed by processor 404).

In addition to memory 329, mobile device 401 may include one or more other types of memory such as flash memory (or SD card) 1008 and/or a hard disk and/or an optical disk (also called "secondary memory") to store data and/or software for loading into memory 329 (also called "main memory") and/or for use by processor(s) 404. Mobile device 401 may further include a wireless transmitter and receiver in transceiver 1010 and/or any other communication interfaces 1009. It should be understood that mobile device 401 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

A mobile device 401 of the type described above may include other position determination methods such as object recognition using "computer vision" techniques. The mobile device 401 may also include means for remotely controlling a real world object which may be a toy, in response to user input on mobile device 401 e.g. by use of transmitter in transceiver 1010, which may be an IR or RF transmitter or a wireless a transmitter enabled to transmit one or more signals over one or more types of wireless communication networks such as the Internet, WiFi, cellular wireless network or other network. The mobile device 401 may further include, in a user interface, a microphone and a speaker (not labeled). Of course, mobile device 401 may include other elements unrelated to the present disclosure, such as a read-only-memory 1007 which may be used to store firmware for use by processor 404.

Also, depending on the embodiment, a mobile device 401 may perform reference free tracking and/or reference based tracking using a local detector in mobile device 401 to detect text on objects (e.g. billboards) in a scene of real world, in implementations that execute the OCR software 1014 to generate augmented text (e.g. a word translated from Hindi in an image, into the language English) to display to on screen 402. The above-described identification of letter candidates for use by OCR software 1014 may be performed in software (executed by one or more processors or processor cores) or in hardware or in firmware, or in any combination thereof.

In some embodiments of mobile device 401, the above-described contour upsampler 352, MSER Identifier 355 and image subsampler 351 are included in a text recognition module that is implemented by a processor 404 executing the software 328 in memory 329 of mobile device 401, although in other embodiments any one or more of contour upsampler 352, MSER Identifier 355 and image subsampler 351 are implemented in any combination of hardware circuitry and/or firmware and/or software in mobile device 401. Hence, depending on the embodiment, various functions of the type described herein of a text recognition module may be implemented in software (executed by one or more processors or processor cores) or in dedicated hardware circuitry or in firmware, or in any combination thereof.

Accordingly, depending on the embodiment, any one or more of contour upsampler 352, MSER Identifier 355 and image subsampler 351 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware 1013 (FIG. 7) or software 328, or hardware 1012 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any non-transitory machine-readable medium tangibly embodying software instructions (also called "computer instructions") may be used in implementing the methodologies described herein. For example, software 328 (FIG. 7) may include program codes stored in memory 329 and executed by processor 404 to implement, image subsampler 771, or MSER identifier 775, or contour upscaler 772, or OCR software 1014 or all of them or part of each. Memory 329 may be implemented within or external to the processor 404 depending on the embodiment. If implemented in firmware and/or software, the logic of image subsampler 771, or MSER identifier 775, or contour upscaler 772, or OCR software 1014 may be stored as one or more instructions or code on a non-transitory computer-readable storage medium. Examples include non-transitory computer-readable storage media encoded with a data structure (such as set 4315, set 432S and/or set 451) and computer-readable media encoded with a computer program configured to implement the logic of image subsampler 771, and/or MSER identifier 775, and/or contour upscaler 772, and/or OCR software 1014.

Non-transitory computer-readable media includes physical computer storage media. A non-transitory storage medium may be any available non-transitory medium that can be accessed by a computer. By way of example, and not limitation, such non-transitory computer-readable media can comprise RAM, ROM, Flash Memory, EEPROM, CD-ROM or other optical disk storage, magnetic disk storage or other magnetic storage devices, or any other non-transitory medium that can be used to store program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although several aspects are illustrated in connection with specific embodiments for instructional purposes, the embodiments are not limited thereto. Hence, although item shown in FIGS. 4A and 2B of some embodiments is a mobile device 401, in other embodiments item is implemented by use of form factors that are different, e.g. in certain other embodiments item is a mobile platform (such as a tablet, e.g. iPad available from Apple, Inc.) while in still other embodiments item 401 is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer 1015 communicating over one or more wireless link(s) with sensors and user input circuitry enclosed in a housing of mobile device 401 (FIG. 7) that is small enough to be held in a hand.

Although in some embodiments, a single image (e.g. from a still shot) is subsampled for MSER processing to identify regions, followed by upsampling identified regions that are then subject to text recognition, in other embodiments a sequence of images in a video are processed in the above-described manner, similar to processing of the single image.

Various adaptations and modifications may be made without departing from the scope of the described embodiments. Therefore, the spirit and scope of the appended claims should not be limited to the foregoing description. It is to be understood that several other aspects of the described embodiments will become readily apparent to those skilled in the art from the description herein, wherein it is shown and described various aspects by way of illustration. The drawings and detailed description are to be regarded as illustrative in nature and not as restrictive.

The invention claimed is:

1. A method to identify regions, the method comprising:
   receiving an image of a scene of real world;
   creating a plurality of sets of positions automatically, by at least performing comparisons using multiple pluralities of pixels hereinafter compared pixels that are located in the image at corresponding positions comprised in the plurality of sets of positions;
   wherein a first set in the plurality of sets of positions is created without using in any comparison, a plurality of pixels hereinafter skipped pixels that are located in the image at additional positions comprised in the first set;
   wherein a first region identified by the first set is contiguous in the image, the first region comprising the compared pixels and the skipped pixels identified respectively by the corresponding positions and the additional positions;
   wherein a second region is contiguous in the image, the second region being identified by positions in a second set, in the plurality of sets of positions created by the creating;
   checking automatically, whether a test is satisfied by a first attribute of the first region and a second attribute of the second region;
   preparing automatically, a merged set comprising the positions in the first set and the positions in the second set, based on at least an outcome of said test; and
   storing automatically, in one or more memories, the merged set;
   wherein the receiving, the creating, the checking, the preparing and the storing are performed by one or more processors coupled to the one or more memories.

2. The method of claim 1 further comprising:
   low-pass filtering the image, hereinafter original image, prior to the creating, to obtain a low-pass image;
   wherein comparisons performed by said performing use pixels located adjacent to one another in the low-pass image, thereby to exclude from the comparisons the skipped pixels of the original image.

3. The method of claim 1 wherein:
   comparisons performed by said performing are between a pair of pixels that are separated in the first region from one another by one or more of the skipped pixels;
   the comparisons are performed repeatedly; and
   a number of pixels to be skipped in a next comparison at a next iteration are determined at least partially based on a predetermined threshold being not exceeded by a difference in intensities, between one compared pixel used in a current comparison at a current iteration and another compared pixel used in a prior comparison at a prior iteration.

4. The method of claim 1 further comprising:
   using a discrete wavelet transform of the image to determine a factor; and
   using at least the factor, to identify a number of pixels to be skipped in performing the creating.

5. The method of claim 4 wherein:
   the factor depends on a limit being not exceeded by at least one coefficient, of the discrete wavelet transform of the image.

6. The method of claim 1 wherein:
   comparisons performed by said performing are between an intensity i used as a threshold and the intensity of each pixel included in a region Qi among the first region and the second region;
   said region Qi comprises a local extrema in said image; and
   said region Qi is maximally stable relative to changes in a range i−Δ to i+Δ, with a local minima in ratio [Qi−Δ−Qi+Δ]/Qi occurring at the intensity i.

7. The method of claim 1 wherein:
   the one or more processors and the one or more memories are comprised in a handheld device; and
   the image is received by the one or more processors from a camera comprised in the handheld device.

8. The method of claim 1 further comprising:
   determining an attribute of a rectangular block that comprises pixels identified in the merged set; and
   applying the test based on said attribute, to at least intensities of pixels identified in the merged set, to generate binary values.

9. The method of claim 8 further comprising:
   classifying the rectangular block as text or non-text.

10. A handheld device to generate regions of binary values for use in text recognition, the handheld device comprising:
    one or more memories comprising an image of a scene of real world;
    one or more processors operatively coupled to the one or more memories to execute therefrom a plurality of instructions, the plurality of instructions comprising:
    first instructions to create a plurality of sets of positions automatically, by at least performing comparisons using multiple pluralities of pixels hereinafter compared pixels that are located in the image at corresponding positions comprised in the plurality of sets of positions;
    wherein a first set in the plurality of sets of positions is created without using in any comparison, a plurality of pixels hereinafter skipped pixels that are located in the image at additional positions comprised in the first set;

wherein a first region identified by the first set is contiguous in the image, the first region comprising the compared pixels and the skipped pixels identified respectively by the corresponding positions and the additional positions;

wherein a second region is contiguous in the image, the second region being identified by positions in a second set, in the plurality of sets of positions created by the creating;

second instructions to check, whether a test is satisfied by a first attribute of the first region and a second attribute of the second region;

third instructions to prepare a merged set comprising the positions in the first set and the positions in the second set, based on at least an outcome of said test; and fourth instructions to store in at least one memory, the merged set.

11. The handheld device of claim 10 further comprising:

fifth instructions to low-pass filter the image, hereinafter original image, prior to execution of the first instructions, to obtain a low-pass image;

wherein comparisons performed by said performing are performed using pixels located adjacent to one another in the low-pass image, thereby to exclude from the comparisons the skipped pixels of the original image.

12. The handheld device of claim 10 wherein:

comparisons performed by said performing are between a pair of pixels that are separated in the first region from one another by one or more of the skipped pixels;

the comparisons are performed repeatedly; and a number of pixels to be skipped in a next comparison at a next iteration are determined at least partially based on a predetermined threshold being not exceeded by a difference in intensities, between one compared pixel used in a current comparison at a current iteration and another compared pixel used in a prior comparison at a prior iteration.

13. The handheld device of claim 10 wherein:

comparisons performed by said performing are between an intensity i used as a threshold and the intensity of each pixel included in a region Qi among the first region and the second region;

said region Qi is maximally stable relative to changes in a range i−Δ to i+Δ, with a local minima in ratio [Qi−Δ−Qi+Δ]/Qi occurring at the intensity i.

14. The handheld device of claim 10 wherein the plurality of instructions comprise:

fifth instructions to determine an attribute of a rectangular block that comprises pixels identified in the merged set and apply the test based on said attribute, to at least intensities of the pixels identified in the merged set, to generate binary values.

15. The handheld device of claim 10 wherein the plurality of instructions comprise:

fifth instructions to classify a rectangular block as text or non-text.

16. The handheld device of claim 10 further comprising:

a camera to capture the image and store the image in the one or more memories.

17. One or more non-transitory computer readable storage media comprising a sequence of instructions, which, when executed cause a processor to perform operations, the sequence of instructions comprising:

first instructions to create a plurality of sets of positions automatically, by at least performing comparisons using multiple pluralities of pixels hereinafter compared pixels that are located in an image at corresponding positions comprised in the plurality of sets of positions;

wherein a first set in the plurality of sets of positions is created without using in any comparison, a plurality of pixels hereinafter skipped pixels that are located in the image at additional positions comprised in the first set;

wherein a first region identified by the first set is contiguous in the image, the first region comprising the compared pixels and the skipped pixels identified respectively by the corresponding positions and the additional positions;

wherein a second region is contiguous in the image, the second region being identified by positions in a second set, in the plurality of sets of positions created by the creating;

second instructions to check, whether a test is satisfied by a first attribute of the first region and a second attribute of the second region;

third instructions to prepare a merged set comprising the positions in the first set and the positions in the second set, based on at least an outcome of said test; and fourth instructions to store in at least one memory, the merged set.

18. The one or more non-transitory computer readable storage media of claim 17 wherein the sequence of instructions comprise:

fifth instructions to low-pass filter the image, hereinafter original image, prior to execution of the first instructions, to obtain a low-pass image;

wherein comparisons performed by execution of the first instructions are performed using pixels located adjacent to one another in the low-pass image, thereby to exclude from the comparisons the skipped pixels of the original image.

19. The one or more non-transitory computer readable storage media of claim 17 wherein:

comparisons performed by execution of the first instructions are between a pair of pixels that are separated in the first region from one another by one or more of the skipped pixels;

the comparisons are performed repeatedly; and a number of pixels to be skipped in a next comparison at a next iteration are determined at least partially based on a predetermined threshold being not exceeded by a difference in intensities, between one compared pixel used in a current comparison at a current iteration and another compared pixel used in a prior comparison at a prior iteration.

20. The one or more non-transitory computer readable storage media of claim 17 wherein:

comparisons performed by execution of the first instructions are between an intensity i used as a threshold and the intensity of each pixel included in a region Qi among the first region and the second region;

said region Qi is maximally stable relative to changes in a range i−Δ to i+Δ, with a local minima in ratio [Qi−Δ−Qi+Δ]/Qi occurring at the intensity i.

21. The one or more non-transitory computer readable storage media of claim 17 wherein the sequence of instructions comprise:

fifth instructions to determine an attribute of a rectangular block that comprises pixels identified in the merged set;

sixth instructions to apply the test based on said attribute, to at least intensities of pixels identified in the merged set, to generate binary values; and seventh instructions to classify the rectangular block as text or non-text.

22. An apparatus for generating binary values for use in text recognition, the apparatus comprising:

first means for creating a plurality of sets of positions automatically, by at least performing comparisons using multiple pluralities of pixels hereinafter compared pixels that are located in an image at corresponding positions comprised in the plurality of sets of positions;

wherein a first set in the plurality of sets of positions is created without using in any comparison, a plurality of pixels hereinafter skipped pixels that are located in the image at additional positions comprised in the first set;

wherein a first region identified by the first set is contiguous in the image, the first region comprising the compared pixels and the skipped pixels identified respectively by the corresponding positions and the additional positions;

wherein a second region is contiguous in the image, the second region being identified by positions in a second set, in the plurality of sets of positions created by the creating;

second means for checking, whether a test is satisfied by a first attribute of the first region and a second attribute of the second region;

third means for preparing a merged set comprising the positions in the first set and the positions in the second set, based on at least an outcome of said test; and fourth means for storing in at least one memory, the merged set.

23. The apparatus of claim 22 further comprising:

means for low-pass filtering the image, hereinafter original image, coupled to the first means to supply thereto a low-pass image;

wherein comparisons performed by operation of the first means are performed using pixels located adjacent to one another in the low-pass image, thereby to exclude from the comparisons the skipped pixels of the original image.

24. The apparatus of claim 22 wherein:

comparisons performed by operation of the first means are between a pair of pixels that are separated in the first region from one another by one or more of the skipped pixels;

the comparisons are performed repeatedly; and a number of pixels to be skipped in a next comparison at a next iteration are determined at least partially based on a predetermined threshold being not exceeded by a difference in intensities, between one compared pixel used in a current comparison at a current iteration and another compared pixel used in a prior comparison at a prior iteration.

25. The apparatus of claim 22 wherein:

comparisons performed by operation of the first means are between an intensity i used as a threshold and the intensity of each pixel included in a region Qi among the first region and the second region;

said region Qi is maximally stable relative to changes in a range $i-\Delta$ to $i+\Delta$, with a local minima in ratio $[Q_{i-\Delta}-Q_{i+\Delta}]/Q_i$ occurring at the intensity i.

26. The apparatus of claim 22 further comprising:

means for determining an attribute of a rectangular block that comprises pixels identified in the merged set;

means for applying the test based on said attribute, to at least intensities of the pixels identified in the merged set, to generate a plurality of binary values; and means for classifying the rectangular block as text or non-text.

* * * * *